United States Patent [19]
Bell

[11] 3,843,683
[45] Oct. 22, 1974

[54] α-[3-(4-CHLOROBENZOYL)-2-METHYL-6-METHOXY-1-INDOLE]-ACETIC ACID

[75] Inventor: Malcolm R. Bell, East Greenbush, N.Y.

[73] Assignee: Sterling Drug Inc., New York, N.Y.

[22] Filed: Nov. 22, 1971

[21] Appl. No.: 201,142

Related U.S. Application Data

[63] Continuation-in-part of Ser. No. 9,945, Feb. 9, 1970, abandoned, which is a continuation-in-part of Ser. No. 706,802, Feb. 20, 1968, Pat. No. 3,557,142.

[30] Foreign Application Priority Data

Dec. 29, 1969 Great Britain.................. 7719/69

[52] U.S. Cl. ............... 260/326.13 R, 260/326.14 R
[51] Int. Cl.............................................. C07d 27/56
[58] Field of Search ........................... 260/326.13 R

[56] References Cited
UNITED STATES PATENTS
3,505,354  4/1970  Doebel et al. ................. 260/326.13

FOREIGN PATENTS OR APPLICATIONS
1,492,929  7/1967  France .......................... 260/326.13

*Primary Examiner*—Joseph A. Narcavage
*Attorney, Agent, or Firm*—Elmer J. Lawson; Wlllliam G. Webb

[57] ABSTRACT

New 3-substituted-1-indole-lower-alkanoic acids and esters having useful anti-inflammatory activity and prepared by alkylation of a 3-substituted-indole with an appropriate halo-lower-alkanoic acid or ester.

1 Claim, No Drawings

α-[3-(4-CHLOROBENZOYL)-2-METHYL-6-METHOXY-1-INDOLE]-ACETIC ACID

This application is a continuation-in-part of my prior copending application Ser. No. 9,945, filed Feb. 9, 1970 now abandoned, which in turn is a continuation-in-part of my prior filed application Ser. No. 706,802, filed Feb. 20, 1968, now U.S. Pat. No. 3,557,142, patented Jan. 19, 1971.

This invention relates to certain 3-substituted-1-indole-lower-alkanoic acids and esters having the formula:

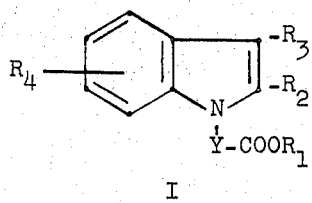

I where $R_1$ is hydrogen or lower-alkyl; $R_2$ is hydrogen or lower-alkyl; $R_3$ is phenyl, benzoyl, thiophenecarbonyl, furancarbonyl, pyridinecarbonyl, isoxazolecarbonyl, thiazolecarbonyl, isothiazolecarbonyl, phenyl-lower-alkyl, phenyl-lower-alkenoyl, cycloalkylcarbonyl, adamantanecarbonyl, biphenylcarbonyl, phenoxy, phenylmercapto, or phenylsulfonylmethyl; $R_4$ is a hydrogen atom or a methylenedioxy or ethylenedioxy group attached to adjacent carbon atoms or one to three of the same or different members of the group consisting of halogen, lower-alkyl, nitro, amino, lower-alkanoylamino, di-lower-alkylamino, trifluoromethyl, lower-alkanoyloxy, or hydroxy; and Y is lower-alkylene.

Also within the purview of the instant invention are compounds having the formula

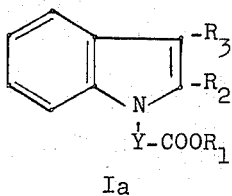

Ia where $R_1$ is hydrogen, lower-alkyl, or an alkali metal cation; $R_2$ is hydrogen or lower-alkyl; $R_3$ is benzoyl or benzoyl substituted by from one to three lower-alkoxy groups or by from one to two halogen atoms; and Y is lower-alkylene containing from one to three carbon atoms. Particularly preferred compounds within the genus described by formula Ia as defined above are those where $R_3$ is benzoyl or benzoyl substituted by a single lower-alkoxy group or by from one to two halogen atoms, and Y is methylene or 1,2-ethylene, and especially preferred species are the compounds:

α-[3-(4-chlorobenzoyl)-2-methyl-6-methoxy-1-indole]acetic acid;
β-(3-benzoyl-2-methyl-1-indole)propionic acid;
α-[3-(4-chlorobenzoyl)-2-methyl-1-indole]propionic acid;
α-[3(4-chlorobenzoyl)-2-methyl-1-indole]acetic acid;
α-(3-benzoyl-1-indole)acetic acid;
α-[3-(4-chlorobenzoyl)-1-indole]acetic acid;
ethyl α-[3-(4-chlorobenzoyl)-2-methyl-1-indole]acetate;
α-(3-benzoyl-2-methyl-1-indole)acetic acid;
sodium β-(3-benzoyl-2-methyl-1-indole)propionate;

α-[3-(4-methoxybenzoyl)-2-methyl-1-indole]acetic acid; and
α-[3-(3,4-dichlorobenzoyl)-2-methyl-1-indole]acetic acid.

Also considered to be within the purview of the instant invention are compounds having the formula:

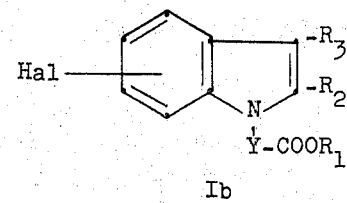

Ib where $R_1$ is hydrogen or an alkali metal cation; $R_2$ is lower-alkyl; $R_3$ is benzoyl or benzoyl substituted by halogen; Hal is halogen; and Y is methylene or 1,2-ethylene. Particularly preferred species within the ambit of the invention as defined by formula Ib above are:

β-[3-(4-chlorobenzoyl)-2-methyl-5-fluoro-1-indole]propionic acid;
α-[3-(4-chlorobenzoyl)-2-methyl-5-fluoro-1-indole]acetic acid;
β-(3-benzoyl-2-methyl-5-fluoro-1-indole)propionic acid;
α-(3-benzoyl-2-methyl-5-fluoro-1-indole)acetic acid;

α-(3-benzoyl-2-methyl-5-chloro-1-indole)acetic acid; and
β-(3-benzoyl-2-methyl-5-chloro-1-indole)propionic acid.

Also within the scope of the instant invention are compounds having the formula:

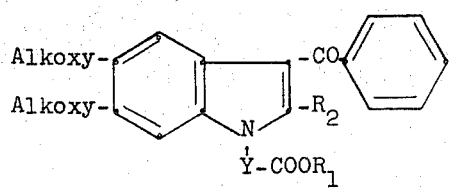

where $R_1$ is hydrogen or lower-alkyl; $R_2$ is lower-alkyl; each Alkoxy contains from one to six carbon atoms; and Y is lower-alkylene, and particularly preferred species within the ambit of formula Ic above are:

α-(3-benzoyl-5,6-dimethoxy-2-methyl-1-indole)acetic acid; and
β-(3-benzoyl-5,6-dimethoxy-2-methyl-1-indole)propionic acid.

The compounds of formulas I, Ia, Ib, and Ic are useful as anti-inflammatory agents as more fully discussed hereinafter.

As used herein, the term "lower-alkyl" (or "lower-alkoxy" or "alkoxy") means saturated, monovalent aliphatic radicals, including straight or branched-chain radicals of from one to six carbon atoms in the alkyl moiety, as illustrated by, but not limited to, methyl, ethyl, propyl, isopropyl, n-butyl, t-butyl, amyl, hexyl, and the like.

As used herein, the term "lower-alkylene" means divalent, saturated, aliphatic radicals, including straight or branched-chain radicals of from one to six carbon atoms, as illustrated by, but not limited to, methylene, 1,1-ethylene, 1,2-ethylene, 1,3-propylene, 1,2-propylene, 1,6-hexylene, and the like.

As used herein, the term "cycloalkyl" means saturated, monocarbocyclic radicals containing from three to six carbon atoms, as illustrated by cyclopropyl, cyclobutyl, cyclopentyl, or cyclohexyl.

As used herein the term "phenyl-lower-alkenoyl" means a monovalent radical derived from a phenyl-lower-alkenoic acid by removal of the hydroxyl group from the carboxylic moiety thereof. The term "phenyl-lower-alkenoyl" includes straight or branched-chain lower-alkenoyl radicals containing from three to six carbon atoms in the lower-alkenoyl moiety, and thus includes, inter alia, cinnamoyl, α-methylcinnamoyl, β-ethylcinnamoyl, and the like.

The compounds of formulas I, I$a$, I$b$, and I$c$ are prepared by reaction of an appropriate 3-substituted-indole with a halo-lower-alkanoic acid or lower-alkyl ester thereof in the presence of an acid-acceptor which serves to take up the hydrogen halide split out during the course of the reaction. The reaction is represented by the equation:

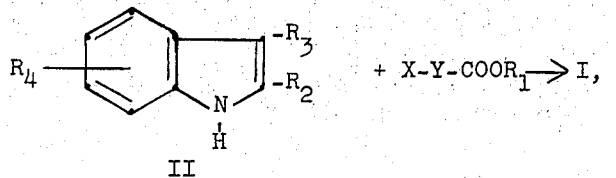

where $R_1$, $R_2$, $R_3$, $R_4$, and Y have the meanings given above, X represents halogen, and where, with reference in this particular instance only to the method of preparation of the final products, it is understood that $R_4$ also represents the benzenoid substituents common to the compounds of formulas I$a$, I$b$, and I$c$. The reaction is carried out at a temperature from 20°C. to about 150°C. in an organic solvent inert under the conditions of the reaction, for example benzene, toluene, xylene, dimethylformamide, and the like. A preferred solvent is dimethylformamide, and a preferred acid-acceptor is sodium hydride.

The compounds of formula I where $R_3$ is benzyl or substituted-benzyl can also be prepared by Wolff-Kishner reduction of the corresponding compounds where $R_3$ is benzoyl or substituted-benzoyl. That is, the latter compounds are reacted with hydrazine in the presence of strong alkali, e.g. potassium hydroxide, at an elevated temperature, i.e. in the range from about 130° to 230°C., and preferably in an alkanol, polyhydroxy alkane, or glycol ether as solvent. A preferred solvent is triethylene glycol.

The compounds of formulas I, I$a$, I$b$, or I$c$ where $R_1$ is hydrogen can also be prepared by saponification of the corresponding esters where $R_1$ is lower-alkyl by heating a solution of the latter in a lower-alkanol, for example methanol, ethanol, isopropanol, and the like, and containing a molar excess of an alkali metal hydroxide, for example sodium or potassium hydroxide.

The intermediate 3-substituted-indoles of formula II where $R_3$ is phenyl, phenoxy, or phenylmercapto are prepared by Fischer indole cyclization of an $R_2$-benzyl, $R_2$-phenoxymethyl, or $R_2$-phenylmercaptomethyl ketone (or aldehyde) phenylhydrazone according to the reaction:

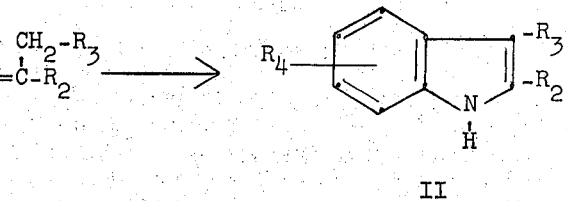

where $R_2$ and $R_3$ have the meanings given above, and $R_4$ is understood, in this instance, to include, in addition to its particular meanings given above, the benzenoid groups in the compounds of formulas I$a$, I$b$, and I$c$. The reaction is carried out by heating the hydrazone III in the presence of an acid, for example hydrochloric acid, sulfuric acid, p-toluenesulfonic acid, glacial acetic acid, and the like, in an organic solvent inert under the conditions of the reaction, for example methanol, ethanol, isopropanol, benzene, toluene, and the like. When glacial acetic acid is used as the acid condensing agent, it can be used as the solvent medium as well.

The hydrazones of formula III in turn are prepared by reacting a phenylhydrazine of formula IV with an appropriate $R_2$-benzyl, $R_2$-phenoxymethyl, or $R_2$-phenylmercaptomethyl ketone (or aldehyde) of formula V. The reaction is represented by the equation:

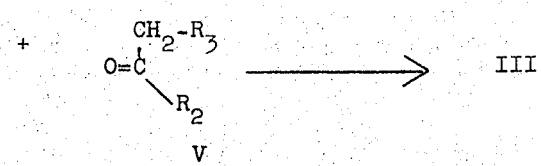

and generally takes place at room temperature. Like the cyclization of the hydrazones of formula III to the indoles of formula II, the reaction is advantageously carried out in an organic solvent inert under the conditions of the reaction, for example methanol, ethanol, isopropanol, and the like, and in the presence of an acid, for example hydrochloric acid, sulfuric acid, p-toluenesulfonic acid, glacial acetic acid, and the like.

The hydrazones of formula III thus formed can, if desired, be isolated from the reaction mixture before cyclizing to the indoles of formula II, but it is preferred to carry the reaction to completion, without isolating the intermediate hydrazones, by heating the reaction mixture containing the hydrazone which itself is formed at lower temperatures.

The phenylhydrazines of formula IV and the ketones of formula V are old classes of compounds, and many different species thereof are known.

The intermediate 3-substituted-indoles of formula II where $R_3$ is benzoyl, thiophenecarbonyl, furancarbonyl, pyridine-carbonyl, isoxazolecarbonyl, thiazolecarbonyl, isothiazolecarbonyl, phenyl-lower-alkenoyl, cycloalkylcarbonyl, adamantanecarbonyl, or biphenyl-carbonyl are prepared by reacting the acid halide corresponding to the acids defined by the foregoing $R_3$ groups with an appropriate indole magnesium halide which in turn is prepared by reaction of an appropriate indole with a lower-alkyl magnesium halide. The method is represented by the equations:

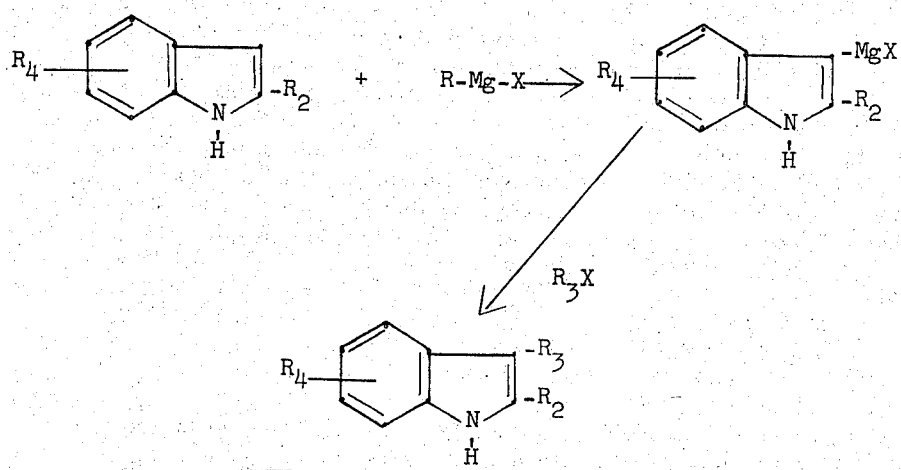

where $R_2$ and $R_3$ have the meanings given above, R represents lower-alkyl, X represents halogen, and $R_4$ is understood, in this instance, to include, in addition to its particular meanings given above, the benzenoid groups common to the compounds of formulas Ia, Ib, and Ic. The reaction is carried out at a temperature from 20°C. to about 100°C. in an organic solvent inert under the conditions of the reaction, for example diethyl ether, tetrahydrofuran, dioxane, and the like.

The intermediate 3-substituted-indoles of formula II where $R_3$ is phenyl-lower-alkyl are prepared by reducing, with an alkali metal aluminum hydride, the corresponding compounds where $R_3$ is benzoyl or phenyl-lower-alkanoyl. The reaction takes place at temperatures in the range from about 20°C. to about 80°C. in an organic solvent inert under the conditions of the reaction, for example diethyl ether or tetrahydrofuran. It is preferred to carry out the reaction in tetrahydrofuran at the boiling point thereof.

The compounds of formula II where $R_3$ is phenyl-sulfonylmethyl are prepared by reaction of an appropriate 3-unsubstituted indole with a phenylsulfinic acid and formaldehyde in an acid medium. The reaction is carried out at a temperature in the range from 80°C. to around 200°C. in an organic solvent inert under the conditions of the reaction, for example dimethylformamide or glacial acetic acid or in a combination of these solvents.

The compounds of formulas I, Ia, Ib, and Ic where $R_1$ is hydrogen are interconvertible with the compounds where $R_1$ is lower-alkyl, and moreover the acids are interconvertible with salts, for example alkali metal or alkaline earth salts, or ammonium or amine salts, e.g. N-methylglucamine, and the salts are considered to be the full equivalents of the acids and esters hereclaimed. Thus the acids ($R_1$ is hydrogen) are prepared from the esters ($R_2$ is lower-alkyl) by saponification of the latter with alkali. The salts are obtained from the corresponding acids by reaction of the latter with one molar equivalent of an appropriate base, for example an alkali metal hydroxide, alkaline earth hydroxide, ammonia or an amine, and isolation of the product from a neutral or basic medium. The lower-alkyl esters ($R_1$ is lower-alkyl) are obtained from the corresponding acids by esterification of the latter with a loweralkanol in the presence of a mineral acid.

The compounds of formulas I and II are antiinflammatory agents as determined in standard and recognized pharmacological tests as described hereinbelow.

Anti-inflammatory activity of the compounds was determined by one or more of three standards test procedures for determination of anti-inflammatory activity, namely by the inhibition of carrageenin-induced local foot edema in rats, by the adjuvant-induced arthritis test, and by the inhibition of asbestos pellet induced granuloma test.

The inhibition of carrageenin-induced local foot edema test used is generally described by Winter et al., Proc. Soc. Exp. Biol. Med. 111, 544 (1962). The tests were carried out in fasted male Sprague-Dawley rats weighing approximately 100 to 115 grams from which all food was withdrawn twenty-four hours prior to medication. The rats were divided into groups of at least five rats per group, and suspensions of the compounds in gum tragacanth were administered by stomach tube in a volume of 1 ml. per 100 g. of body weight. A control group of animals received only the gum tragacanth. This treatment was followed one hour later by injection into the plantar tissue of the right hind paw of all test and control animals of 0.05 ml. of a 1 percent aqueous suspension of carrageenin. As a control, the left hind paw was similarly injected with saline. Swelling of the carrageenin-injected paw reached a peak in from three to five hours, and the increase in swelling three hours after injection of the carrageenin was adopted as a measure of effect. The inhibition of carrageenin induced edema in treated animals over untreated controls is then determined by procedures involving either a measure of the relative weights or volumes of the edema. One method involving determination of the weight of the edema is that described previously in my earlier copending application Ser. No. 706,802. A preferable method involving the determination of the volume of the edema is described as follows: Three hours following carrageenin injection, the increase in foot volume, i.e. the edema formation (the difference between the left hind paw and the uninjected right hind paw) was measured plethysmographically. The extended paw was immersed to the top of the most proximal callus pad into a mercury filled glass cylinder connected to a pressure transducer and the impulse amplified and recorded by a polygraph. The polygraph was standardized so that a 3.6 mm. deflection on the recording paper was equivalent to 0.1 ml. volume. The results were expressed either in terms of the percent inhibition at a dose of 100 mg./kg. calculated from the average differences in foot volume between the control and medicated rats or in terms of the $AED_{40}$, the Average Effective Dose producing 40 percent inhibition of the inflammation, the latter value being calculated from a doseresponse curve. The compounds were thus found to have an $AED_{40}$ in the range from 17 to 110 mg./kg. The toxicities of the compounds, expressed in terms of the Approximate Lethal $Dose_{50}$ ($ALD_{50}$), determined on oral administration in rats, were found to be in the range from 800 to <1,000 mg./kg.

The adjuvant-induced arthritis test used is a modification of that described by Pearson, J. Chronic Diseases, 16, 863 (1963) and Glen et al., Am. J. Vet. Res., 26, 1180 (1965). Adult male rats weighing 200–230 g. were injected into the plantar tissue of the left hind paw with 0.1 ml. of a 0.6 percent suspension of adjuvant in heavy mineral oil. A negative control group was injected with the mineral oil only. Beginning on the ninth day after injection, suspensions of the test compounds in 1 percent gum tragacanth were administered by stomach tube six times daily to the animals in a volume of 1 ml. per 100 g. of body weight. Both the negative control and the adjuvant injected control animals received the vehicle only. Food and water were permitted ad libitum, and 24 hours following the last medication, the animals were weighed, and the increase in foot volume was measured plethysmographically. The extended paw was immersed to the top of the most proximal callus pad into a mercury filled glass cylinder connected to a pressure transducer, and the impulse was amplified and recorded by a polygraph. The polygraph was standardized for each assay so that at 3.6 mm. deflection on the recording paper was equivalent to 0.1 ml. of volume. The results were expressed as percent inhibition calculated from the average differences in foot volume between the adjuvant injected control and medicated rats correcting the difference in foot volume of the oil injected negative control group.

The asbestos pellet test used is a modification of the method described by Meier et al., Experientia, 6, 469 (1950). Young male rats weighing 100–120 g. were placed under light ether anaesthesia, and a single sterilized asbestos pellet, punched from Leitz No. 3 filter pads and weighing approximately 30 mg., was implanted subcutaneously in the interscapular area via a small skin incision and closed with a wound clip. Beginning on the day of pellet implantation, the animals were administered by stomach tube seven daily medications of the test compound suspended in 1 percent gum tragacanth in a volume of 1 ml. per 100 g. of body weight. Control animals were given the vehicle only. Food and water were permitted ad libitum, and 24 hours following the last medication, the animals were weighed, sacrificed, and the pellets with surrounding granuloma were carefully removed and weighed. The results were expressed as percent inhibition of fresh granuloma weights calculated from the differences between the average granuloma weights of control and medicated rats.

Although the compounds are less active on a weight-to-weight basis than the known anti-inflammatory agent, [1-(4-chlorobenzoyl)-5-methoxy-2-methyl-3-indole]acetic acid (indomethacin), they are relatively less toxic, i.e. have a more favorable ratio of the toxic to the active dose.

The compounds can be prepared for use by dissolving or suspending them in aqueous alcohol, glycol or oil solution, or oil-in-water emulsions in the same manner as conventional medicinal substances are prepared. Alternatively, they can be incorporated in unit dosage form as tablets or capsules for oral administration either alone or in combination with suitable adjuvants such as calcium carbonate, starch, lactose, talc, magnesium stearate, gum acacia, and the like. The compounds are administered to any suitable mammalian host in a dose range of 2–100 mg./kg.

The chemical structures of the compounds of the invention are established by their mode of synthesis and are corroborated by infrared, ultraviolet, and nuclear magnetic resonance spectra and by the correspondence between calculated values for the elements and values found by chemical analysis.

The following examples will further illustrate specific embodiments without the invention being limited thereto. The melting points are uncorrected.

EXAMPLE 1

A. 3-Benzoylindole [II: $R_2$ is H; $R_3$ is $C_6H_5CO$; $R_4$ is H]

To a solution of 160 ml. of a 3M ether solution of ethyl magnesium bromide diluted with 100 ml. of absolute ether was added with stirring, over a period of 45 minutes, a solution of 50 g. (0.43 mole) of indole in 300 ml. of absolute ether while maintaining the temperature at 0°–5°C. The resulting yellow suspension was allowed to warm to 15°C. for 30 minutes and was then cooled to 0°–5°C. and treated with a solution of 60 g. (0.43 mole) of benzoyl chloride in 90 ml. of absolute ether. The mixture was then refluxed for 2½ hours, allowed to stand at room temperature overnight, treated with 400 ml. of saturated aqueous ammonium chloride, and the ether-soluble product was extracted with 1,500 ml. of tetrahydrofuran. The extracts were dried over anhydrous sodium sulfate and evaporated to dryness in vacuo to give a light pink solid which was recrystallized from ethyl acetate giving 50 g. of 3-benzoylindole, m.p. 237°–239°C.

B. Ethyl α-(3-benzoyl-1-indole)acetate [Ia: $R_1$ is $C_2H_5$; $R_2$ is H; $R_3$ is $C_6H_5CO$; Y is $CH_2$]

A mixture of 20 g. (0.09 mole) of 3-benzoylindole and 5.1 g. (0.11 mole) of a 52 percent suspension of sodium hydride in mineral oil in 250 ml. of dry dimethylformamide was stirred at room temperature for 45 minutes. The resulting orange, almost clear solution was treated all at once with 17.9 g. (0.11 mole) of ethyl bromoacetate, and the resulting solution was stirred for 2 hours and then allowed to stand for 6 hours. The clear, red-brown solution was diluted with 2 liters of ethyl acetate, washed with three 500 ml. portions of water, once with saturated brine, dried over anhydrous sodium sulfate and evaporated to dryness in vacuo to give 30.2 g. of ethyl α-(3-benzoyl-1-indole) acetate, which on recrystallization from ethanol gives material of m.p. 136°–138°C. (uncorr.).

C. α-(3-Benzoyl-1-indole) acetic acid [Ia: $R_1$ and $R_2$ are H; $R_3$ is $C_6H_5CO$; Y is $CH_2$]

A solution of 30.2 g. (0.10 mole) of ethyl α-(3-benzoyl-1-indole)acetate in 400 ml. of ethanol and 105 ml. of 10 percent aqueous sodium hydroxide was refluxed for 2 hours, and the solvent removed by evaporation in vacuo. The residual yellow gum was dissolved in two liters of 50 percent ethanol/water and the solution acidified to pH 1 with 33 percent hydrochloric acid. The flocculent precipitate was collected, dried, and recrystallized twice from ethanol to give 18.1 g. of α-(3-benzoyl-1-indole) acetic acid, m.p. 216°–218°C.

EXAMPLE 2

A. 3-Benzoyl-2-methylindole [II: $R_2$ is $CH_3$; $R_3$ is $C_6H_5CO$; $R_4$ is H] was prepared by reaction of 103 g. (0.73 mole) of benzoyl chloride with the Grignard reagent prepared from 96 g. (0.73 mole) of 2-methylindole and 275 ml. (0.82 mole) of a 3M ether solution of ethyl magnesium bromide in a total volume of about 950 ml. of diethyl ether using the procedure described above in Example IA. The crude product was recrystallized from ethyl acetate to give 93.5 g. of 3-benzoyl-2-methylindole, m.p. 183°–184°C.

B. Ethyl α-(3-benzoyl-2-methyl-1-indole)acetate [Ia: $R_1$ is $C_2H_5$; $R_2$ is $CH_3$; $R_3$ is $C_6H_5CO$; Y is $CH_2$] was prepared by reacting 20.0 g. (0.085 mole) of 3-benzoyl-2-methylindole with 17.0 g. (0.10 mole) of ethyl bromoacetate in 250 ml. of dry dimethylformamide in the presence of 4.85 g. (0.103 mole) of a 52 percent suspension of sodium hydride in mineral oil using the procedure described above in Example 1B. There was thus obtained 35.2 g. of ethyl α-(3-benzoyl-2-methyl-1-indole)acetate as a brown oil.

C. α-(3-Benzoyl-2-methyl-1-indole)acetic acid [Ia: $R_1$ is H; $R_2$ is $CH_3$; $R_3$ is $C_6H_5CO$; Y is $CH_2$] was prepared by saponification of 35.2 g. (0.11 mole) of ethyl α-(3-benzoyl-2-methyl-1-indole)-acetate in a solution of 400 ml. of ethanol and 100 ml. of 10 percent aqueous sodium hydroxide using the procedure described above in Example 1C. The crude product was recrystallized twice from ethanol to give 13.2 g. of α-(3-benzoyl-2-methyl-1-indole)acetic acid, m.p. 211°–212°C.

EXAMPLE 3

A. Ethyl β-(3-benzoyl-2-methyl-1-indole)propionate [Ia: $R_1$ is $C_2H_5$; $R_2$ is $CH_3$; $R_3$ is $C_6H_5CO$; Y is $CH_2CH_2$] was prepared by reacting 20.0 g. (0.085 mole) of 3-benzoyl-2-methylindole with 18.5 g. (0.102 mole) of ethyl β-bromopropionate in 250 ml. of dry dimethylformamide in the presence of 4.8 g. (0.103 mole) of a 52 percent suspension of sodium hydride in mineral oil using the procedure described above in Example 1B. There was thus obtained 34.0 g. of ethyl β-(3-benzoyl-2-methyl-1-indole)propionate as a brown oil.

B. β-(3-Benzoyl-2-methyl-1-indole)propionic acid [Ia: $R_1$ is H; $R_2$ is $CH_3$; $R_3$ is $C_6H_5CO$; Y is $CH_2CH_2$] was prepared by saponification of 34.0 g. (0.10 mole) of ethyl β-(3-benzoyl-2-methyl-1-indole)propionate in a solution of 400 ml. of ethanol and 100 ml. of 10 percent aqueous sodium hydroxide using the procedure described above in Example 1C. The crude product was recrystallized twice from ethanol to give 13.5 g. of β-(3-benzoyl-2-methyl-1-indole)-propionic acid, m.p. 205°–207°C.

EXAMPLE 4

A. 3-(4-Chlorobenzoyl)indole [II: $R_2$ is H; $R_3$ is 4—$ClC_6H_4CO$; $R_4$ is H] was prepared by reaction of 74.0 g. (0.43 mole) of 4-chlorobenzoyl chloride with the Grignard reagent prepared from 50.0 g. (0.43 mole) of indole and 160 ml. (0.49 mole) of a 3M ether solution of ethyl magnesium bromide in a total volume of about 450 ml. of diethyl ether using the procedure described above in Example 1A. The crude product was recrystallized from ethyl acetate to give 52.6 g. of 3-(4-chlorobenzoyl)indole, m.p. 180°–200°C.

B. Ethyl α-[3-chlorobenzoyl)-1-indole]acetate [Ia: $R_1$ is $C_2H_5$; $R_2$ is H; $R_3$ is $4-ClC_6H_4CO$; Y is $CH_2$] was prepared by reaction of 15.7 g. (0.94 mole) of ethyl bromoacetate with 20.0 g. (0.078 mole) of 3-(4-chlorobenzoyl)indole in 250 ml. of anhydrous dimethylformamide in the presence of 4.5 g. (0.094 mole) of a 50 percent suspension of sodium hydride in mineral oil using the procedure described above in Example 1B. There was thus obtained 31.7 g. of ethyl α-[3-(4-chlorobenzoyl)-1-indole]acetate as an off-white solid which, after recrystallization from ethanol, afforded material of m.p. 159°–161°C. (uncorr.).

C. α-[3-(4-Chlorobenzoyl)-1-indole]acetic acid [Ia: $R_1$ and $R_2$ are H; $R_3$ is $4-ClC_6H_4CO$; Y is $CH_2$] was prepared by saponification of 31.7 g. (0.093 mole) of ethyl α-[3-(4-chlorobenzoyl)-1-indole]-acetate in a solution of 400 ml. of ethanol and 100 ml. of 10 percent aqueous sodium hydroxide using the procedure described above in Example 1C. The crude product was recrystallized once from ethanol/benzene and once from ethanol to give 13.6 g. of α-[3-(4-chlorobenzoyl)-1-indole]acetic acid, m.p. 235°–236°C.

EXAMPLE 5

A. 3-(4-Chlorobenzoyl)-2-methylindole [II: $R_2$ is $CH_3$; $R_3$ is 4—$ClC_6H_4CO$; $R_4$ is H] was prepared by reaction of 133.5 g. (0.96 mole) of 4-chlorobenzoyl chloride with the Grignard reagent prepared from 100 g. (0.70 mole) of 2-methylindole and 300 ml. (0.90 mole) of a 3M ether solution of ethyl magnesium bromide in a total volume of about 1100 ml. of absolute diethyl ether using the procedure described above in Example 1A. The crude product was recrystallized from ethyl acetate to give 157 g. of 3-(4-chlorobenzoyl)-2-methylindole, m.p. 181°–183°C.

B. Ethyl α-[3-(4-chlorobenzoyl)-2-methyl-1-indole]acetate [Ia: $R_1$ is $C_2H_5$; $R_2$ is $CH_3$; $R_3$ is 4—$ClC_6H_4CO$; Y is $CH_2$] was prepared by reaction of 74.3 g. (0.45 mole) of ethyl bromoacetate with 100 g. (0.37 mole) of 3-(4-chlorobenzoyl)-2-methylindole in one liter of anhydrous dimethylformamide in the presence of 21.0 g. (0.46 mole) of 52 percent suspension of sodium hydride in mineral oil using the procedure described above in Example 1B. There was thus obtained 146.4 g. of crude product as a peach colored solid of which 25 g. was recrystallized from ethanol to give 15.1 g. of ethyl α-[3-(4-chlorobenzoyl)-2-methyl-1-indole]acetate as a white, peach-tinted solid, m.p. 145°–146°C.

C. α-[3-(4-Chlorobenzoyl)-2-methyl-1-indole]acetic acid [Ia: R is H; $R_2$ is $CH_3$; $R_3$ is 4—$ClC_6H_4CO$; Y is $CH_2$] was prepared by saponification of 39 g. (0.11 mole) of ethyl α-[3-(4-chlorobenzoyl)-2-methyl-1-indole]acetate in a solution of 800 ml. of ethanol and 200 ml. of 10 percent aqueous sodium hydroxide using the procedure described above in Example 1C. The crude product was recrystallized twice from ethanol and dried in vacuo at 100°C. to give 10.6 g. of α-[3-(4- chlorobenzoyl)-2-methyl-1-indole]-acetic acid, m.p. 233°–236°C.

EXAMPLE 6

A. Ethyl β-[3-(4-chlorobenzoyl)-2-methyl-1-indole]propionate [Ia: $R_1$ is $C_2H_5$; $R_2$ is $CH_3$; $R_3$ is 4—$ClC_6H_4CO$; Y is $CH_2CH_2$] was prepared by reaction of 20.8 g. (0.115 mole) of ethyl β-bromopropionate with 28 g. (0.104 mole) of 3-(4-chlorobenzoyl)-2-methylindole in the presence of 5.3 g. (0.12 mole) of a 52 percent suspension of sodium hydride in mineral oil in a total of 250 ml. of dimethylformamide using the procedure described above in Example 1B. There was thus obtained 36 g. of ethyl β-[3-(4-chlorobenzoyl)-2-methyl-1-indole]propionate as a yellow, viscous oil.

B. β-[3-(4-Chlorobenzoyl)-2-methyl-1-indole]propionic acid [Ia: $R_1$ is H; $R_2$ is $CH_3$; $R_3$ is 4—$ClC_6H_4CO$; Y is $CH_2CH_2$] was prepared by saponification of 36 g. (0.098 mole) of ethyl β-[3-(4-chlorobenzoyl)-2-methyl-1-indole]propionate in a solution of 800 ml. of ethanol and 200 ml. of 10 percent aqueous sodium hydroxide using the procedure described above in Example 1C. The crude product was recrystallized twice from tetrahydrofuran to give 11.0 g. of β-[3-(4-chlorobenzoyl)-2-methyl-1-indole]propionic acid, m.p. 224°–227°C. (dec.).

EXAMPLE 7

A. 3-(3,4-Dichlorobenzoyl)-2-methylindole [II: $R_2$ is $CH_3$; $R_3$ is 3,4—$Cl_2C_6H_3CO$: $R_4$ is H] was prepared by reaction of 100 g. (0.48 mole) of 3,4-dichlorobenzoyl chloride with the Grignard reagent prepared from 62.5 g. (0.48 mole) of 2-methylindole and 191 ml. (0.57 mole) of an approximately 3M ether solution of methyl magnesium bromide in a total of 800 ml. of anhydrous diethyl ether using the procedure described above in Example 1A. There was thus obtained 20.8 g. of 3-(3,4-dichlorobenzoyl)-2-methylindole, m.p. 229°–230°C.

3-(3,4-Dichlorobenzoyl)-2-methylindole was studied in electrolyte excretion modification tests in rats, and found to be active as a kaluretic agent at a dose of 30 mg./kg. (s.c.). The test for electrolyte excretion modification was carried out as follows: Male Charles River CD rats weighing 180 to 195 g. were maintained in the laboratory for one week to equilibrate them, during which time water and food were provided ad libitum. All food was removed from the cages of the test animals approximately 18 hours preceding the test, and water was removed 2½ hours preceding the test. All test animals were then voided of urine by applying pressure with the fingers over the region of the bladder, and after weighing, were divided into experimental groups and placed into individual metabolism cages equipped for urine collection. All rats were then administered intraperitoneally 10 ml. of Krebs Ringer phosphate solution, and the test compound, prepared as a suspension in 10 percent ethanol-cottonseed oil, was injected subcutaneously immediately following administration of the Krebs Ringer solution. A second and third injection of the test compound were administered two and four hours later, care being taken at all times to prevent urine loss by holding the animal over the collection funnel while injecting. Twenty-four hours following the injection of the Krebs Ringer solution, the animals were again voided of urine while being held over the collection funnel. The animals were then sacrificed by injection of pentobarbital prior to final weighing. Urine volumes were recorded in each case, and the metabolism cages were washed down with small amounts of distilled water, and the urine samples with the water washings were diluted to 50 ml. with distilled water. Suitable aliquots were then analyzed for sodium, potassium, chloride, magnesium, phosphorus, calcium, and nitrogen by standard analytical procedures.

B. Ethyl α-[3-(3,4-dichlorobenzoyl)-2-methyl-1-indole]acetate [Ia: $R_1$ is $C_2H_5$; $R_2$ is $CH_3$; $R_3$ is 3,4—$Cl_2C_6H_3CO$; Y is $CH_2$] was prepared by reaction of 23.0 g. (0.14 mole) of ethyl bromoacetate with 35.0 g. (0.12 mole) of 3-(3,4-dichlorobenzoyl)-2-methylindole in 250 ml. of anhydrous dimethylformamide and in the presence of 5.92 g. (0.138 mole) of a 56 percent suspension of sodium hydride in mineral oil using the procedure described above in Example 1B. There was thus obtained 48 g. of ethyl α-[3-(3,4-dichlorobenzoyl)-2-methyl-1-indole]acetate as a yellow oil.

C. α-[3-(3,4-Dichlorobenzoyl)-2-methyl-1-indole]acetic acid [Ia: $R_1$ is H; $R_2$ is $CH_3$; $R_3$ is 3,4—$Cl_2C_6H_3CO$; Y is $CH_2$] was prepared by saponification of 48 g. (0.12 mole) of ethyl α-[3-(3,4-dichlorobenzoyl)-2-methyl-1-indole]acetate in a solution of 500 ml. of ethanol and 125 ml. of 10 percent aqueous sodium hydroxide using the procedure described above in Example 1C. The crude product was recrystallized three times from ethanol giving 19.5 g. of α-[3-(3,4-dichlorobenzoyl)-2-methyl-1-indole]acetic acid, m.p. 212°–214°C.

EXAMPLE 8

A. 3-(4-Chlorobenzoyl)-6-methoxy-2-methylindole [II: $R_2$ is $CH_3$; $R_3$ is 4—$ClC_6H_4CO$; $R_4$ is 6-$CH_3O$] was prepared by reaction of 21.5 g. (0.123 mole) of 4-chlorobenzoyl chloride with the Grignard reagent prepared from 18 g. (0.11 mole) of 6-methoxy-2-methylindole and 64 ml. (0.12 mole) of a 2M ether solution of methyl magnesium bromide in a total volume of about 400 ml. of tetrahydrofuran using the procedure described above in Example 1A. The crude product of m.p. 145°–170°C. consisting of 1,3-di-(4-chlorobenzoyl)-6-methoxy-2-methylindole, was dissolved in ethanol and benzene and warmed gently with a solution of 6 g. of sodium hydroxide in 50 ml. of $H_2O$ to hydrolyze off the 1-(4-chlorobenzoyl) group introduced during the reaction. The product was recrystallized from benzene to give 3-(4-chlorobenzoyl)-6-methoxy-2-methylindole as pale yellow, micro crystals, m.p. 206°–208.5°C.

B. Ethyl α-[3-(4-chlorobenzoyl)-6-methoxy-2-methyl-1-indole]-acetate [I: $R_1$ is $C_2H_5$; $R_2$ is $CH_3$; $R_3$ is 4-$ClC_6H_4CO$; $R_4$ is 6-$CH_3O$; Y is $CH_2$] was prepared by reaction of 1.39 g. (0.019 mole) of ethyl bromoacetate with 5.2 g. (0.017 mole) of 3-(4-chlorobenzoyl)-6-methoxy-2-methylindole in the presence of 0.88 g. (0.019 mole) of a 52 percent suspension of sodium hydride in mineral oil in 50 ml. of dimethylformamide using the procedure described above in Example 1B. There was thus obtained 6 g. of ethyl α-[3-(4-chlorobenzoyl)-6-methoxy-2-methyl-1-indole]acetate as a light brown gum.

C. α[3-(4-Chlorobenzoyl)-6-methoxy-2-methyl-1-indole]acetic acid [I: $R_1$ is H; $R_2$ is $CH_3$; $R_3$ is 4—$ClC_6H_4CO$; $R_4$ is 6—$CH_3O$; Y is $CH_2$] was prepared by saponification of 6 g. (0.016 mole) of ethyl α-[3-(4-chlorobenzoyl)-6-methoxy-2-methyl-1-indole]acetate in a solution of 400 ml. of ethanol and 50 ml. of 10 percent aqueous sodium hydroxide using the procedure described above in Example 1C. The crude product was recrystallized from ethanol to give 4.0 g. of α-[3-(4-chlorobenzoyl)-6-methoxy-2-methyl-1-indole]acetic acid, m.p. 230.5°14 234°C.

EXAMPLE 9

A. 3-(4-Methylbenzoyl)-2-methylindole [II: $R_2$ is $CH_3$; $R_3$ is 4—$CH_3C_6H_4CO$; $R_4$ is H] was prepared by reaction of 59 g. (0.38 mole) of 4-methylbenzoyl chloride with the Grignard reagent prepared from 50 g. (0.38 mole) of 2-methylindole and 140 ml. (0.42 mole) of a 3M ether solution of ethyl magnesium bromide in a total of about 550 ml. of absolute diethyl ether using the procedure described above in Example 1A. The crude product was recrystallized from ethyl acetate to give 67 g. of 3-(4-methylbenzoyl)-2-methylindole, m.p. 202°–204.5°C.

B. Ethyl α-[3-(4-methylbenzoyl)-2-methyl-1-indole]acetate [I: $R_1$ is $C_2H_5$; $R_2$ is $CH_3$; $R_3$ is 4—$CH_3C_6H_4CO$; $R_4$ is H; Y is $CH_2$] was prepared by reaction of 23.4 g. (0.14 mole) of ethyl bromoacetate with 32 g. (0.13 mole) of 3-(4-methylbenzoyl)-2-methylindole in the presence of 5.4 g. (0.14 mole) of a 62 percent suspension of sodium hydride in mineral oil in 250 ml. of dimethylformamide using the procedure described above in Example 1B. There was thus obtained 62 g. of ethyl α-[3-(4-methylbenzoyl)-2-methyl-1-indole]acetate as a yellow solid.

C. α-[3-(4-Methylbenzoyl)-2-methyl-1-indole]acetic acid [I: $R_1$ is H; $R_2$ is $CH_3$; $R_3$ is 4—$CH_3C_6H_4CO$; $R_4$ is H; Y is $CH_2$] was prepared by saponification of 62 g. (0.19 mole) of ethyl α-[3-(4-methylbenzoyl)-2-methyl-1-indole]acetate in a solution of 450 ml. of ethanol and 125 ml. of 35 percent aqueous sodium hydroxide using the procedure described above in Example 1C. The crude product was recrystallized three times from ethanol to give 21.5 g. of α-[3-(4-methylbenzoyl)-2-methyl-1-indole]acetic acid, m.p. 226°–229.5°C. (dec.).

EXAMPLE 10

A. 3-(4-Methoxybenzoyl)-2-methylindole [II: $R_2$ is $CH_3$; $R_3$ is 4—$CH_3OC_6H_4CO$; $R_4$ is H] was prepared by reaction of 75.9 g. (0.45 mole) of 4-methoxybenzoyl chloride with the Grignard reagent prepared from 50 g. (0.38 mole) of 2-methylindole and 150 ml. (0.45 mole) of a 3M ether solution of ethyl magnesium bromide in a total of about 550 ml. of absolute ether using the procedure described above in Example 1A. There was thus obtained 111.4 g. of 3-(4-methoxybenzoyl)-2-methylindole.

B. Ethyl α-[3-(4-methoxybenzoyl)-2-methyl-1-indole]acetate [Ia: $R_1$ is $C_2H_5$; $R_2$ is $CH_3$; $R_3$ is 4—$CH_3OC_6H_4CO$; Y is $CH_2$] was prepared by reaction of 18.9 g. (0.113 mole) of ethyl bromoacetate with 25 g. (0.09 mole) of 3-(4-methoxybenzoyl)-2-methylindole in the presence of 5.3 g. (0.11 mole) of a 52 percent suspension of sodium hydride in mineral oil in 250 ml. of anhydrous dimethylformamide using the procedure described above in Example 1B. There was thus obtained 41 g. of ethyl α-[3-(4-methoxybenzoyl)-2-methyl-1-indole]acetate as a red oil.

C. α-[3-(4-Methoxybenzoyl)-2-methyl-1-indole]acetic acid [Ia: $R_1$ is H; $R_2$ is $CH_3$; $R_3$ is 4—$CH_3OC_6H_4CO$; Y is $CH_2$] was prepared by saponification of 41 g. (0.12 mole) of ethyl α-[3-(4-methoxybenzoyl)-2-methyl-1-indole]acetate in a solution of 400 ml. of ethanol and 100 ml. of 10 percent aqueous sodium hydroxide using the procedure described above in Example 1C. The crude product was recrystallized twice from ethanol to give 16.0 g. of α-[3-(4-methoxybenzoyl)-2-methyl-1-indole]acetic acid, m.p. 208°–210°C.

EXAMPLE 11

A. 3-(4-Trifluoromethylbenzoyl)-2-methylindole [II: $R_2$ is $CH_3$; $R_3$ is 4—$CF_3C_6H_4CO$; $R_4$ is H] was prepared by reaction of 50.0 g. (0.24 mole) of 4-trifluoromethylbenzoyl chloride with the Grignard reagent prepared by reacting 32.2 g. (0.24 mole) of 2-methylindole with 100 ml. (0.30 mole) of a 3M ether solution of methyl magnesium bromide in a total volume of about 375 ml. of absolute diethyl ether using the procedure described above in Example 1A. The crudes product was recrystallized twice from ethyl acetate to give 42 g. of 3-(4-trifluoromethylbenzoyl)-2-methylindole, m.p. 195°–197°C.

3-(4-Trifluoromethylbenzoyl)-2-methylindole, in standard serial dilution anti-bacterial tests, was found to be bacteriostatic against the organism *Staphylococcus aureus* at a concentration of 0.075 mg./ml. Antibacterial activity was determined using standard serial dilution tests as described, for example, by Bailey et al., J. Am. Pharm. Assn., Sc. Ed., 48, 212 (1959).

B. Ethyl α-[3-(4-trifluoromethylbenzoyl)-2-methyl-1-indole]-acetate [I: $R_1$ is $C_2H_5$; $R_2$ is $CH_3$; $R_3$ is 4—$CF_3C_6H_4CO$; $R_4$ is H; Y is $CH_2$] was prepared by reaction of 10.95 g. (0.099 mole) of ethyl bromoacetate with 25.0 g. (0.083 mole) of 3-(4-trifluromethylbenzoyl)-2-methylindole in the presence of 4.25 g. (0.099 mole) of a 56 percent suspension of sodium hydride in mineral oil in 500 ml. of dimethylformamide using the procedure described above in Example 1B. The crude product was recrystallized three times from ethanol to give 3.5 g. of ethyl α-[3-(4-trifluoromethylbenzoyl)-2-methyl-1-indole]acetate, m.p. 128°–132°C.

C. α-[3-(4-Trifluoromethylbenzoyl)-2-methyl-1-indole]acetic acid [I: $R_1$ is H; $R_2$ is $CH_3$; $R_3$ is 4—$CF_3C_6H_4CO$; $R_4$ is H; Y is $CH_2$] was prepared by saponification of 28 g. (0.72 mole) of ethyl α-[3-(4-trifluoromethylbenzoyl)-2-methyl-1-indole]acetate in a solution of 400 ml. of ethanol and 100 ml. of 10 percent aqueous sodium hydroxide using the procedure described above in Example 1C. The crude product was recrystallized from ethanol to give 2.7 g. of α-[3-(4-trifluoromethylbenzoyl)-2-methyl-1-indole]acetic acid, m.p. 228°–231°C. (dec.).

EXAMPLE 12

A. Ethyl β-(3-benzoyl-1-indole)propionate [Ia: $R_1$ is $C_2H_5$; $R_2$ is H; $R_3$ is $C_6H_5CO$; Y is $CH_2CH_2$] was prepared by reacting 19.0 g. (0.086 mole) of 3-benzoylindole with 20 g. (0.12 mole) of ethyl β-bromopropionate in 250 ml. of dimethylformamide in the presence of 5.0 g. of a 52 percent suspension of sodium hydride in mineral oil using the procedure described above in Example 1B. There was thus obtained 27.7 g. of ethyl β-(3-benzoyl-1-indole)propionate as a brown oil.

B. β-(3-Benzoyl-1-indole)propionic acid [Ia: $R_1$ and $R_2$ are H; $R_3$ is $C_6H_5CO$; Y is $CH_2CH_2$] was prepared by saponification of 27.7 g. (0.086 mole) of ethyl β-(3-benzoyl-1-indole)propionate in 400 ml. of ethanol and 100 ml. of 10 percent aqueous sodium hydroxide using the procedure described above in Example 1C. The crude product was recrystallized twice from ethanol giving 6.5 g. of β-(3-benzoyl-1-indole)propionic acid, m.p. 190°–193°C.

EXAMPLE 13

A. 3-Cinnamoyl-2-methylindole [II: $R_2$ is $CH_3$; $R_3$ is $C_6H_5CH=CHCO$; $R_4$ is H] was prepared by reaction of 64 g. (0.38 mole) of cinnamoyl chloride in 200 ml. of a 1:1 solution of ethyl ether and tetrahydrofuran with the Grignard reagent prepared from 50 g. (0.38 mole) of 2-methylindole and 138 ml. (0.41 mole) of a 3M ether solution of ethyl magnesium bromide in a total volume of about 350 ml. of absolute ether using the procedure described above in Example 1A. The crude product was recrystallized from ethyl acetate to give 36.5 g. of 3-cinnamoyl-2-methylindole, m.p. 153.5°–156.5°C. (resolidifies and melts at 166°–168°C.).

B. Ethyl α-(3-cinnamoyl-2-methyl-1-indole)acetate [I: $R_1$ is $C_2H_5$; $R_2$ is $CH_3$; $R_3$ is $C_6H_5CH=CHCO$; $R_4$ is H; Y is $CH_2$] was prepared by reacting 16.6 g. (0.062 mole) of 3-cinnamoyl-2-methylindole with 11.3 g. (0.068 mole) of ethyl bromoacetate in 125 ml. of dry dimethylformamide in the presence of 2.68 g. (0.069 mole) of a 62 percent suspension of sodium hydride in mineral oil using the procedure described above in Example 1B. There was thus obtained 20 g. of ethyl α-(3-cinnamoyl-2-methyl-1-indole)acetate, m.p. 110°–112°C.

C. α-(3-Cinnamoyl-2-methyl-1-indole)acetic acid [I: $R_1$ is H; $R_2$ is $CH_3$; $R_3$ is $C_6H_5CH=CHCO$; $R_4$ is H; Y is $CH_2$] was prepared by saponification of 20 g. (0.058 mole) of ethyl α-(3-cinnamoyl-2-methyl-1-indole)acetate in a solution containing 30 g. of potassium hydroxide in 250 ml. of methanol using the procedure described above in Example 1C. The crude product was recrystallized from ethanol to give 9.6 g. of α-(3-cinnamoyl-2-methyl-1-indole)acetic acid, m.p. 220°–225°C.

EXAMPLE 14

A. Ethyl β-(3-cinnamoyl-2-methyl-1-indole)propionate [I: $R_1$ is $C_2H_5$; $R_2$ is $CH_3$; $R_3$ is $C_6H_5CH=CHCO$; $R_4$ is H; Y is $CH_2CH_2$] was prepared by reacting 14.5 g. (0.056 mole) of 3-cinnamoyl-2-methylindole with 11.05 g. (0.061 mole) of ethyl β-bromopropionate in 100 ml. of dry dimethylformamide in the presence of 2.42 g. (0.061 mole) of a 61 percent suspension of sodium hydride in mineral oil using the procedure described above in Example 1B. There was thus obtained 20 g. of ethyl β-(3-cinnamoyl-2-methyl-1-indole)propionate as a yellow gum.

B. β-(3-Cinnamoyl-2-methyl-1-indole)propionic acid [I: $R_1$ is H; $R_2$ is $CH_3$; $R_3$ is $C_6H_5CH=CHCO$; $R_4$ is H; Y is $CH_2CH_2$] was prepared by saponification of 20 g. (0.063 mole) of ethyl β-(3-cinnamoyl-2-methyl-1-indole)propionate in a solution containing 30 g. of potassium hydroxide dissolved in 200 ml. of methanol using the procedure described above in Example 1C. The crude product was recrystallized from ethanol to give 7.5 g. of β-(3-cinnamoyl-2-methyl-1-indole)propionic acid, m.p. 164°–166°C. (resolidifies and melts 190°–191°C.).

EXAMPLE 15

A. 3-Benzoyl-2-methyl-5,6-dimethoxyindole [II: $R_2$ is $CH_3$; $R_3$ is $C_6H_5CO$; $R_4$ is 5,6—$(CH_3O)_2$] was prepared by reaction of 14.0 g. (0.1 mole) of benzoyl chloride with the Grignard reagent prepared from 19.1 g. (0.1 mole) of 2-methyl-5,6-dimethoxyindole and 37 ml. (0.11 mole) of a 3M ether solution of ethyl magnesium bromide in a total volume of 150 ml. of tetrahydrofuran using the procedure described above in Example 1A. The crude product was recrystallized from ethanol giving 6.1 g. of 3-benzoyl-2-methyl-5,6-dimethoxyindole, m.p. 210°–212°C.

B. Ethyl α-(3-benzoyl-2-methyl-5,6-dimethoxy-1-indole)acetate [Ic: $R_1$ is $C_2H_5$; $R_2$ is $CH_3$; each Alkoxy is $CH_3O$; Y is $CH_2$] was prepared by reacting 15 g. (0.051 mole) of 3-benzoyl-2-methyl-5,6-dimethoxyindole with 9.35 g. (0.056 mole) of ethyl bromoacetate in 120 ml. of dry dimethylformamide in the presence of 2.23 g. (0.056 mole) of a 61 percent suspension of sodium hydride in mineral oil using the procedure described above in Example 1B. There was thus obtained ethyl α-(3-benzoyl-2-methyl-5,6-dimethoxy-1-indole)acetate as a pale yellow solid.

C. α-(3-Benzoyl-2-methyl-5,6-dimethoxy-1-indole)acetic acid [Ic: $R_1$ is H; $R_2$ is $CH_3$; each Alkoxy is $CH_3O$; Y is $CH_2$] was prepared by saponification of the ethyl α-(3-benzoyl-2-methyl-5,6-dimethoxy-1-indole)acetate described above in Example 15B, in a solution containing 30 g. of potassium hydroxide in 200 ml. of ethanol using the procedure described above in Example 1C. The crude product was recrystallized from ethanol and dried in vacuo at 100°C. to give 11.5 g. of α-(3-benzoyl-2-methyl-5,6-dimethoxy-1-indole)acetic acid, melts partially at 138°–140°C., resolidifies and melts again at 189°–191°C.

EXAMPLE 16

A. Ethyl β-(3-benzoyl-2-methyl-5,6-dimethoxy-1-indole)propionate [Ic: $R_1$ is $C_2H_5$; $R_2$ is $CH_3$; each Alkoxy is $CH_3O$; Y is $CH_2CH_2$] was prepared by reacting 16 g. (0.054 mole) of 3-benzoyl-2-methyl-5,6-dimethoxyindole with 10.3 g. (0.057 mole) of ethyl β-bromopropionate in 100 ml. of dry dimethylformamide in the presence of 2.36 g. (0.06 mole) of a 61 percent suspension of sodium hydride in mineral oil using the procedure described above in Example 1B. There was thus obtained ethyl β-(3-benzoyl-2-methyl-5,6-dimethoxy-1-indole)-propionate as a light brown gum.

B. β-(3-Benzoyl-2-methyl-5,6-dimethoxy-1-indole)propionic acid [Ic: $R_1$ is H; $R_2$ is $CH_3$; each Alkoxy is $CH_3O$; Y is $CH_2CH_2$] was prepared by saponification of the ethyl β-(3-benzoyl-2-methyl-5,6-dimethoxy-1-indole)propionate obtained above in Example 16A in a solution containing 30 g. of potassium hydroxide in 200 ml. of methanol using the procedure described above in Example 1C. The crude product was recrystallized from ethanol to give 12.7 g. of β-(3-benzoyl-2-methyl-5,6-dimethoxy-1-indole)propionic acid, m.p. 198°–201°C.

EXAMPLE 17

A. Ethyl β-[3-(4-methylbenzoyl)-2-methyl-1-indole]propionate [I: $R_1$ is $C_2H_5$; $R_2$ is $Ch_3$; $R_3$ is 4—$CH_3C_6H_4CO$; $R_4$ is H; Y is $CH_2CH_2$] was prepared by reaction of 32 g. (0.13 mole) of 3-(4-methylbenzoyl)-2-methylindole with 25.4 g. (0.14 mole) of ethyl β-bromopropionate in 250 ml. of dimethylformamide in the presence of 5.4 g. (0.14 mole) of a 62 percent suspension of sodium hydride in mineral oil using the procedure described above in Example 1B. There was thus obtained ethyl β-[3-(4-methylbenzoyl)-2-methyl-1-indole]propionate as a yellow gum.

B. β-[3-(4-Methylbenzoyl)-2-methyl-1-indole]propionic acid [I: $R_1$ is H; $R_2$ is $CH_3$; $R_3$ is 4—$CH_3C_6H_4CO$; $R_4$ is H; Y is $CH_2CH_2$] was prepared by saponification of the ethyl β-[3-(4-methylbenzoyl)-2-methyl-1-indole]propionate obtained above in Example 17A in a solution containing 30 g. of potassium hydroxide in 200 ml. of methanol using the manipulative procedure described above in Example 1C. The crude product was recrystallized from ethanol giving 19 g. of β-[3-(4-methylbenzoyl)-2-methyl-1-indole]propionic acid, m.p. 210.5°–213°C.

EXAMPLE 18

A. 3-(2,6-Dimethoxybenzoyl)-2-methylindole [II: $R_2$ is $CH_3$; $R_3$ is 2,6—$(CH_3O)_2C_6H_3CO$; $R_4$ is H] was prepared by reaction of 76 g. (0.38 mole) of 2,6-dimethoxybenzoyl chloride with the Grignard reagent prepared from 50 g. (0.138 mole) of 2-methylindole and 138 ml. (0.38 mole) of a 3M ether solution of ethyl magnesium bromide in a total volume of about 500 ml. of diethyl ether and 100 ml. of tetrahydrofuran using the procedure described above in Example 1A. The crude product was recrystallized once from ethyl acetate and once from ethanol to give 46.5 g. of 3-(2,6-dimethoxybenzoyl)-2-methylindole, m.p. 199°–200°C.

B. Ethyl α-[3-(2,6-dimethoxybenzoyl)-2-methyl-1-indole]acetate [Ia: $R_1$ is $C_2H_5$; $R_2$ is $CH_3$; $R_3$ is 2,6—(CH$_3$O)$_2$C$_6$H$_3$CO; Y is $CH_2$] was prepared by reaction of 20 g. (0.068 mole) of 3-(2,6-dimethoxy-benzoyl)-2-methylindole with 11.3 g. (0.068 mole) of ethyl bromoacetate in 150 ml. of dry dimethylformamide in the presence of 3 g. (0.068 mole) of a 54 percent suspension of sodium hydride in mineral oil using the procedure described above in Example 1B. There was thus obtained ethyl α-[3-(2,6-dimethoxybenzoyl)-2-methyl-1-indole]-acetate.

C. α-[3-(2,6-Dimethoxybenzoyl)-2-methyl-1-indole]acetic acid ethanolate [Ia: $R_1$ is H; $R_2$ is $CH_3$; $R_3$ is 2,6—(CH$_3$O)$_2$C$_6$H$_3$CO; Y is $CH_2$] was prepared by saponification of the ethyl α-[3-(2,6-dimethoxybenzoyl)-2-methyl-1-indole]acetate obtained above in Example 18B is in a solution containing 60 g. of potassium hydroxide in 450 ml. of methanol using the procedure described above in Example 1C. The crude product was recrystallized from ethanol to give 18 g. of α-[3-(2,6-dimethoxybenzoyl)-2-methyl-1-indole]-acetic acid ethanolate as a white crystalline solid, m.p. 250°C. (dec.).

EXAMPLE 19

A. Ethyl β-[3-(2,6-dimethoxybenzoyl)-2-methyl-1-indole]propionate [Ia: $R_1$ is $C_2H_5$; $R_2$ is $CH_3$; $R_3$ is 2,6—(CH$_3$O)$_2$C$_6$H$_3$CO; Y is $CH_2CH_2$] was prepared by reaction of 18 g. (0.06 mole) of 3-(2,6-dimethoxybenzoyl)-2-methylindole with 12.1 g. (0.067 mole) of ethyl β-bromopropionate in 150 ml. of dimethylformamide in the presence of 2.3 g. (0.061 mole) of a 62 percent suspension of sodium hydride in mineral oil using the procedure described above in Example 1B. There was thus obtained 20 g. of ethyl β-[3-(2,6-dimethoxybenzoyl)-2-methyl-1-indole]propionate as an off-white solid.

B. β-[3-(2,6-Dimethoxybenzoyl)-2-methyl-1-indole]propionic acid [Ia: $R_1$ is H; $R_2$ is $CH_3$; $R_3$ is 2,6—(CH$_3$O)$_2$C$_6$H$_3$CO; Y is $CH_2CH_2$] was prepared by saponification of 20 g. (0.051 mole) of ethyl β-[3-(2,6-dimethoxybenzoyl)-2-methyl-1-indole]propionate in a solution containing 75 g. of potassium hydroxide in 500 ml. of methanol using the procedure described above in Example 1C. The crude product was recrystallized from ethanol to give 9 g. of β-[3-(2,6-dimethoxybenzoyl)-2-methyl-1-indole]propionic acid as an off-white solid, m.p. 195°–197.5°C.

EXAMPLE 20

A. 3-(4-Nitrobenzoyl)-2-methylindole [II: $R_2$ is $CH_3$; $R_3$ is 4–NO$_2$C$_6$H$_4$CO; $R_4$ is H] was prepared by reacting 71 g. (0.38 mole) of 4-nitrobenzoyl chloride with the Grignard reagent prepared from 50 g. (0.38 mole) of 2-methylindole and 138 ml. (0.41 mole) of a 3M ether solution of ethyl magnesium bromide in a total of 400 ml. of absolute ether using the procedure described above in Example 1A. The crude product was recrystallized from ethanol to give 96 g. of 3-(4-nitrobenzoyl)-2-methylindole, m.p. 230°C.

B. α-[3-(4-Nitrobenzoyl)-2-methyl-1-indole]acetic acid [I: $R_1$ is H; $R_2$ is $CH_3$; $R_3$ is 4—NO$_2$C$_6$H$_4$CO; $R_4$ is H; Y is $CH_2$] was prepared by reacting 7.5 g. (0.027 mole) of 3-(4-nitrobenzoyl)-2-methylindole with 4.5 g. (0.025 mole) of ethyl bromoacetate in 70 ml. of dimethylformamide in the presence of 1.05 g. (0.027 mole) of a 60 percent suspension of sodium hydride in mineral oil using the procedure described above in Example 1B, and saponification of the resulting ethyl α-[-3-(4-nitrobenzoyl)-2-methyl-1-indole]-acetate, m.p. 156°–158.5°C. (uncorr.) (recrystallized from ethanol), in a solution containing 20 g. of potassium hydroxide in 200 ml. of methanol using the procedure described above in Example 1C. The crude product was recrystallized from acetonitrile to give α-[3-(4-nitrobenzoyl)-2-methyl-1-indole]acetic acid as a yellow solid.

EXAMPLE 21

α-(3-Benzoyl-2-methyl-1-indole)propionic acid [Ia: $R_1$ is H; $R_2$ is $CH_3$; $R_3$ is $C_6H_5$CO; Y is $CH_3$CH] was prepared by reaction of 23.5 g. (0.1 mole) of 3-benzoyl-2-methylindole with 18.1 g. (0.1 mole) of ethyl α-bromopropionate in 200 ml. of dry dimethylformamide in the presence of 3.94 g. (0.1 mole) of a 61 percent suspension of sodium hydride in mineral oil using the procedure described above in Example 1B, and saponification of the resulting ethyl α-(3-benzoyl-2-methyl-1-indole)propionate in a solution of 50 g. of potassium hydroxide in 500 ml. of methanol using the procedure described above in Example 1C. The crude product was recrystallized from absolute ethanol to give 8.5 g. of α-(3-benzoyl-2-methyl-1-indole)-propionic acid, m.p. 225°–227°C.

EXAMPLE 22

α-[3-(4-Chlorobenzoyl)-2-methyl-1-indole]propionic acid [Ia: $R_1$ is H; $R_2$ is $CH_3$; $R_3$ is 4—ClC$_6$H$_4$CO; Y is $CH_3$CH] was prepared by reaction of 20 g. (0.074 mole) of 3-(4-chlorobenzoyl)-2-methyl-indole with 13.3 g. (0.074 mole) of ethyl α-bromopropionate in 200 ml. of dimethylformamide in the presence of 3.0 g. (0.075 mole) of a 61 percent suspension of sodium hydride in mineral oil using the procedure described above in Example 1B, and saponification of the resulting ethyl α-[3-(4-chlorobenzoyl)-2-methyl-1-indole]-propionate in a solution of 50 g. of potassium hydroxide in 400 ml. of methanol using the procedure described above in Example 1C. The crude product was recrystallized from ethanol/water to give α-[3-(4-chlorobenzoyl)-2-methyl-1-indole]propionic acid, m.p. 116°C.

EXAMPLE 23

A. 3-(4-Chlorobenzoyl)-2-methyl-5-fluoroindole [II: $R_2$ is $CH_3$; $R_3$ is 4—ClC$_6$H$_4$CO; $R_4$ is 5-F] was prepared by reaction of 25 g. (0.14 mole) of 4-chlorobenzoyl chloride with the Grignard reagent prepared from 12 g. (0.08 mole) of 2-methyl-5-fluoroindole and 30 ml. (0.09 mole) of a 3M ether solution of ethyl magnesium bromide in a total of about 100 ml. of tetrahydrofuran using the procedure described above in Example 1A. There was thus obtained 8 g. of 3-(4-chlorobenzoyl)-2-methyl-5-fluoroindole, m.p. 231°–233°C.

B. α-[3-(4-Chlorobenzoyl)-2-methyl-5-fluoro-1-indole]acetic acid [Ib: $R_1$ is H; $R_2$ is $CH_3$; $R_3$ is 4—ClC$_6$H$_4$CO; Hal is 5-F; Y is $CH_2$] was prepared by reaction of 2.4 g. (0.014 mole) of ethyl bromoacetate with 4 g. (0.015 mole) of 3-(4-chlorobenzoyl)-2-methyl-5-fluoroindole in 40 ml. of dimethylformamide in the presence of 0.6 g. (0.015 mole) of a 60 percent suspension of sodium hydride in mineral oil, and saponification of the resulting ethyl α-[3-(4-chlorobenzoyl)-2-methyl-5-fluoroindole]acetate in a solution containing 10 g. of potassium hydroxide in 100 ml. of methanol all according to the procedure described above in Example 1B and C. There was thus obtained 4.8 g. of α-[3-(4-chlorobenzoyl)-2-methyl-5-fluoro-1-indole]acetic acid which was converted to the sodium salt by dissolving the acid form in dilute sodium hydroxide and precipitating the salt by dilution of the solution with acetone.

EXAMPLE 24

β-[3-(4-Chlorobenzoyl)-2-methyl-5-fluoro-1-indole]propionic acid [Ib: $R_1$ is H; $R_2$ is $CH_3$; $R_3$ is 4—$ClC_6H_4CO$; Hal is 5-F; Y is $CH_2CH_2$] was prepared by reaction of 2.5 g. (0.014 mole) of ethyl β-bromopropionate with 3.8 g. (0.14 mole) of 3-(4-chlorobenzoyl)-2-methyl-5-fluoroindole in 35 ml. of dimethylformamide in the presence of 0.58 g. (0.15 mole) of a 60 percent suspension of sodium hydride in mineral oil, and saponification of the resulting ethyl β-[3-(4-chlorobenzoyl)-2-methyl-5-fluoro-1-indole]propionate in a solution containing 12 g. of potassium hydroxide in 100 ml. of methanol all according to the procedure described above in Example 1B and C. The crude product was recrystallized two times from acetonitrile to give 3.3 g. of β-[3-(4-chlorobenzoyl)-2-methyl-5-fluoro-1-indole]propionic acid, m.p. 205°–207°C.

EXAMPLE 25

A. 3-Benzoyl-2-methyl-5-fluoroindole [II: $R_2$ is $CH_3$; $R_3$ is $C_6H_5CO$; $R_4$ is 5-F] was prepared by reaction of 22.5 g. (0.16 mole) of benzoyl chloride with the Grignard reagent prepared from 12 g. (0.08 mole) of 2-methyl-5-fluoroindole and 30 ml. (0.09 mole) of a 3M ether solution of ethyl magnesium bromide in a total volume of about 100 ml. of tetrahydrofuran using the procedure described above in Example 1A. The crude product was recrystallized from methanol to give 8.6 g. of 3-benzoyl-2-methyl-5-fluoroindole, m.p. 232°–234°C.

B. α-(3-Benzoyl-2-methyl-5-fluoro-1-indole)acetic acid [Ib: $R_1$ is H; $R_2$ is $CH_3$; $R_3$ is $C_6H_5CO$; Hal is 5-F; Y is $CH_2$] was prepared by reacting 2.9 g. (0.017 mole) of ethyl bromoacetate with 4 g. (0.017 mole) of 3-benzoyl-2-methyl-5-fluoroindole in 40 ml. of dimethylformamide in the presence of 0.68 g. (0.017 mole) of a 60 percent suspension of sodium hydride in mineral oil, and saponification of the resulting ethyl α-(3-benzoyl-2-methyl-5-fluoro-1-indole)acetate in a solution containing 10 g. of potassium hydroxide in 100 ml. of methanol all according to the procedure described above in Example 1B and C. The crude product was recrystallized two times from acetonitrile to give 2.2 g. of α-(3-benzoyl-2-methyl-5-fluoro1-indole)acetic acid, m.p. 253°–255°C.

EXAMPLE 26

β-(3-Benzoyl-2-methyl-5-fluoro-1-indole)propionic acid [Ib: $R_1$ is H; $R_2$ is $CH_3$; $R_3$ is $C_6H_5CO$; Hal is 5-F; Y is $CH_2CH_2$] was prepared by reaction of 3.05 g. (0.017 mole) of ethyl β-bromopropionate with 4.0 g. (0.17 mole) of 3-benzoyl-2-methyl-5-fluoroindole in 35 ml. of dimethylformamide in the presence of 0.68 g. (0.018 mole) of a 60 percent suspension of sodium hydride in mineral oil, and saponification of the resulting ethyl β-(3-benzoyl-2-methyl-5-fluoro-1-indole)propionate in a solution containing 12 g. of potassium hydroxide in 100 ml. of methanol all according to the procedure described above in Example 1B and C. The crude product was recrystallized two times from acetonitrile to give 3.4 g. of β-(3-benzoyl-2-methyl-5-fluoro-1-indole)propionic acid, m.p. 228°–230°C.

EXAMPLE 27

A. 3-(2,6-Dichlorobenzoyl)-2-methylindole [II: $R_2$ is $CH_3$; $R_3$ is 2,6-$Cl_2C_6H_3CO$; $R_4$ is H] was prepared by reaction of 105 g. (0.5 mole) of 2,6-dichlorobenzoyl chloride with the Grignard reagent prepared from 65.5 g. (0.5 mole) of 2-methylindole and 180 ml. (0.54 mole) of a 3M ether solution of ethyl magnesium bromide in a total volume of about 600 ml. of absolute diethyl ether and 100 ml. of tetrahydrofuran using the procedure described above in Example 1A. The crude product was recrystallized from ethanol to give 50 g. of 3-(2,6-dichlorobenzoyl)-2-methyl-indole, m.p. 131°–133°C.

B. α-[3-(2,6-Dichlorobenzoyl)-2-methyl-1-indole]acetic acid [Ia: $R_1$ is H; $R_2$ is $CH_3$; $R_3$ is 2,6—$Cl_2C_6H_3CO$; Y is $CH_2$] was prepared by reaction of 9.8 g. (0.057 mole) of ethyl bromoacetate with 17 g. (0.056 mole) of 3-(2,6-dichlorobenzoyl)-2-methylindole in 150 ml. of dimethylformamide in the presence of 2.2 g. (0.054 mole) of a 60 percent suspension of sodium hydride in mineral oil, and saponification of the resulting ethyl α-[3-(2,6-dichlorobenzoyl)-2-methyl-1-indole]acetate in a solution of 30 g. of potassium hydroxide in 400 ml. of hot methanol all according to the procedure described above in Example 1B and C. The crude product was recrystallized from an ethyl acetate/cyclohexane mixture giving 8.9 g. of α-[3-(2,6-dichlorobenzoyl)-2-methyl-1-indole]acetic acid, m.p. 242°–243°C.

EXAMPLE 28

β-[3-(2,6-Dichlorobenzoyl)-2-methyl-1-indole]propionic acid [Ia: $R_1$ is H; $R_2$ is $CH_3$; $R_3$ is 2,6—$Cl_2C_6H_3CO$; Y is $CH_2CH_2$] was prepared by reaction of 10.1 g. (0.056 mole) of ethyl β-bromopropionate with 17 g. (0.56 mole) of 3-(2,6-dichlorobenzoyl)-2-methylindole in 150 ml. of anhydrous dimethylformamide in the presence of 2.2 g. (0.055 mole) of a 60 percent suspension of sodium hydride in mineral oil, and saponification of the resulting ethyl β-[3-(2,6-dichlorobenzoyl)-2-methyl-1-indole]propionate in a solution containing 30 g. of potassium hydroxide in 350 ml. of methanol all according to the procedure described above in Example 1B and C. The crude product was recrystallized from an ethyl acetate/cyclohexane mixture to give 12 g. of β-[2,6-dichlorobenzoyl)-2-methyl-1-indole]propionic acid, m.p. 194°–196°C.

EXAMPLE 29

β-(3-Benzoyl-2-methyl-1-indole)-α-methylpropionic acid [Ia: $R_1$ is H; $R_2$ is $CH_3$; $R_3$ is $C_6H_5CO$; Y is $CH_2CH(CH_3)$] was prepared by reaction of 8.4 g. (0.043 mole) of ethyl α-bromoisobutyrate with 10 g. (0.043 mole) of 3-benzoyl-2-methylindole in 100 ml. of anhydrous dimethylformamide in the presence of 1.7 g. (0.043 mole) of a 60 percent suspension of sodium hydride in mineral oil, and saponification of the resulting ethyl β-(3-benzoyl-2-methyl-1-indole)-α-methylpropionate in a solution containing 30 g. of potassium hydroxide in 300 ml. of methanol all according to the procedure described above in Example 1B and C. The product was recrystallized once from isopropanol and once from ethyl acetate to give 3.5 g. of β-(3-benzoyl-2-methyl-1-indole)-α-methylpropionic acid, m.p. 194°–196°C.

EXAMPLE 30

A. 3-(2-Thenoyl)-2-methylindole [II: $R_2$ is $CH_3$; $R_3$ is 2—$C_4H_3S$—CO; $R_4$ is H] was prepared by reaction of 57 g. (0.38 mole) of thiophene-2-carboxylic acid chloride with the Grignard reagent prepared from 50 g. (0.038 mole) of 2-methylindole and 138 ml. (0.41 mole) of a 3M ether solution of ethyl magnesium bromide in a total of 600 ml. of absolute diethyl ether using the procedure described above in Example 1A. The crude product was recrystallized from ethanol to give 37 g. of 3-(2-thenoyl)-2-methylindole, m.p. 165°–167°C. (uncorr.).

B. α-[3-(2-Thenoyl)-2-methyl-1-indole]acetic acid [I: $R_1$ is H; $R_2$ is $CH_3$; $R_3$ is 2—$C_4H_3S$—CO; $R_4$ is H; Y is $CH_2$] was prepared by reaction of 6.7 g. (0.04 mole) of ethyl bromoacetate with 10 g. (0.04 mole) of 3-(2-thenoyl)-2-methylindole in 100 ml. of anhydrous dimethylformamide in the presence of 1.65 g. (0.04 mole) of a 60 percent suspension of sodium hydride in mineral oil, and saponification of the resulting ethyl α-[3-(2-thenoyl)-2-methyl-1-indole]acetate in a solution of potassium hydroxide in methanol all according to the procedure described above in Example 1B and C. The crude product was recrystallized from acetonitrile to give 8.6 g. of α-[3-(2-thenoyl)-2-methyl-1-indole]acetic acid, m.p. 227–229°C. (uncorr.).

EXAMPLE 31

α-[3-(2-Thenoyl)-2-methyl-1-indole]propionic acid [I: $R_1$ is H; $R_2$ is $CH_3$; $R_3$ is 2—$C_4H_3S$—CO; $R_4$ is H; Y is $CH_3CH$] was prepared by reaction of 7.5 g. (0.04 mole) of ethyl α-bromopropionate with 10 g. (0.04 mole) of 3-(2-thenoyl)-2-methylindole in 100 ml. of dry dimethylformamide in the presence of 1.65 g. (0.04 mole) of a 60 percent suspension of sodium hydride in mineral oil, and saponification of the resulting ethyl α-[3-(2-thenoyl)-2-methyl-1-indole]propionate in a solution containing potassium hydroxide in methanol all according to the procedure described above in Example 1B and C.

EXAMPLE 32

β-[3-(2-Thenoyl)-2-methyl-1-indole]propionic acid [I: $R_1$ is H; $R_2$ is $CH_3$; $R_3$ is 2—$C_4H_3S$—CO; $R_4$ is H; Y is $CH_2CH_2$] was prepared by reaction of 7.5 g. (0.42 mole) of ethyl β-bromopropionate with 10 g. (0.042 mole) of 3-(2-thenoyl)-2-methylindole in 100 ml. of dry dimethylformamide in the presence of 1.75 g. (0.045 mole) of a 61 percent suspension of sodium hydride in mineral oil, and saponification of the resulting ethyl β-[3-(2-thenoyl)-2-methyl-1-indole]- propionate in a solution containing potassium hydroxide in methanol all according to the procedure described above in Example 1B and C. The crude product was recrystallized once from ethyl acetate and once from acetonitrile to give 4.4 g. of β-[3-(2-thenoyl)-2-methyl-1-indole]propionic acid, m.p. 169°–170°C. (uncorr.).

EXAMPLE 33

A. Ethyl α-[3-(4-aminobenzoyl)-2-methyl-1-indole]acetate [I: $R_1$ is $C_2H_5$; $R_2$ is $Ch_3$ ; $R_3$ is 4—$NH_2C_6H_4CO$: $R_4$ is H; Y is $CH_2$]

Ten grams (0.027 mole) of ethyl α-[3-(4-nitrobenzoyl)—2-methyl-1-indole]acetate were dissolved in 200 ml. of ethyl acetate and 50 ml. of methanol and reduced with hydrogen at room temperature in a Parr shaker over 1 g. of a 10 percent palladium-on-charcoal catalyst using an initial hydrogen pressure of about 50 pounds p.s.i. When reduction was complete, the catalyst was removed by filtration, the filtrate taken to dryness, and the residue recrystallized from a chloroform/hexane mixture giving 10 g. of ethyl α-[3-(4-aminobenzoyl)-2-methyl-1-indole]acetate, m.p. 85°–88.5°C.

α-[3-(4-Aminobenzoyl)-2-methyl-1-indole]acetic acid [I: $R_1$ is H; $R_2$ is $CH_3$; $R_3$ is 4—$NH_2C_6H_4CO$: $R_4$ is H; Y is $CH_2$] is prepared by saponification of the ethyl α-[3-(4-aminobenzoyl)-2-methyl-1-indole]acetate obtained above in Example 33A in ethanolic sodium hydroxide using the procedure described above in Example 1C.

EXAMPLE 34

A. 3-Benzoyl-2-t-butylindole [II: $R_2$ is $(CH_3)_3C$; $R_3$ is $C_6H_5CO$; $R_4$ is H]

A mixture of 54 g. (0.5 mole) of phenylhydrazine and 50 g. (0.5 mole) of pinacolone in 300 ml. of benzene was refluxed for seven hours under a Dean-Stark trap, during which time 6 ml. of water was collected. The resulting solution was taken to dryness in vacuo, and the resulting light brown liquid was heated slowly to 100°C. with 400 g. (2.93 moles) of anhydrous zinc chloride. The heating bath was then removed, and the temperature of the reaction mixture rose rapidly to 150°C. The mixture was cooled in a water bath to 130°C. and then heated for 20 minutes at 190°C. After cooling, the mixture was mixed with water and ethyl acetate, the organic phase was separated, washed once with dilute acid, once with dilute sodium bicarbonate, and once with saturated brine. After drying the organic solution over anhydrous sodium sulfate, the solution was taken to dryness, and the residual brown oil was distilled in vacuo, the product being collected at 85°–95°C./ 0.05 mm. There was thus obtained 46 g. of 2-t-butylindole as a colorless solid, m.p. 65°–69°C.

Reaction of 31 g. (0.22 mole) of benzoyl chloride with the Grignard reagent prepared from 19 g. (0.11 mole) of the 2-t-butylindole prepared above and 40 ml. (0.12 mole) of a 3M ether solution of ethyl magnesium bromide in a total of 210 ml. of tetrahydrofuran using the procedure described above in Example 1A, and recrystallization of the crude product from ethanol gave 3-benzoyl-2-t-butylindole, m.p. 215°–220°C.

B. α-(3-Benzoyl-2-t-butyl-1-indole)acetic acid [Ia: $R_1$ is H; $R_2$ is $(CH_3)_3C$; $R_3$ is $C_6H_5CO$; Y is $CH_2$] is prepared by reaction of the 3-benzoyl-2-t-butylindole obtained above in Example 34A with ethyl bromoacetate in dimethylformamide in the presence of sodium hydride, and saponification of the resulting ethyl α-(3-benzoyl-2-t-butyl-1-indole)acetate all according to the procedure described above in Example 1B and C.

EXAMPLE 35

β-(3-Benzoyl-2-t-butyl-1-indole)propionic acid [Ia: $R_1$ is H; $R_2$ is $(CH_3)_3C$; $R_3$ is $C_6H_5CO$; Y is $CH_2CH_2$] is prepared by reaction of 3-benzoyl-2-t-butylindole with ethyl β-bromopropionate in dimethylformamide in the presence of sodium hydride, and saponification of the resulting ethyl β-(3-benzoyl-2-t-butyl-1-indole)propionate all according to the procedure described in Example 1B and C.

EXAMPLE 36

A. 3-(4-Chlorobenzoyl)-2-t-butylindole [II: $R_2$ is $(CH_3)_3C$; $R_3$ is 4—$ClC_6H_4CO$; $R_4$ is H] is prepared by reaction, in anhydrous ether or tetrahydrofuran, of 4-chlorobenzoyl chloride with the Grignard reagent prepared from 2-t-butylindole and methylmagnesium bromide using the procedure described above in Example 1A.

B. α-[3-(4-Chlorobenzoyl)-2-t-butyl-1-indole]acetic acid [Ia: $R_1$ is H; $R_2$ is $(CH_3)_3C$; $R_3$ is 4—$ClC_6H_4CO$; Y is $CH_2$] is prepared by reaction of ethyl bromoacetate with 3-(4-chlorobenzoyl)-2-t-butylindole in dry dimethylformamide in the presence of sodium hydride, and saponification of the resulting ethyl α-[3-(4chlorbenzoyl)-2-t-butyl-1-indole]acetate all according to the procedure described above in Example 1B and C.

EXAMPLE 37

α-[3-(4-Chlorobenzoyl)-2-t-butyl-1-indole]propionic acid [Ia: $R_1$ is H; $R_2$ is $(CH_3)_3C$; $R_3$ is 4—$C_1C_6H_4CO$; Y is $CH_2CH_2$] is prepared by reaction of ethyl β-bromopropionate with 3-(4-chlorobenzoyl)-2-t-butylindole in dry dimethylformamide in the presence of sodium hydride, and saponification of the resulting ethyl β-[3-(4-chlorobenzoyl)-2-t-butyl-1-indole]propionate all according to the procedure described above in Example 1B and C.

EXAMPLE 38

β-[3-(4-Nitrobenzoyl)-2-methyl-1-indole]propionic acid [I: $R_1$ is H; $R_2$ is $CH_3$; $R_3$ is 4—$NO_2C_6H_4CO$; $R_4$ is H; Y is $CH_2CH_2$] was prepared by reaction of 30.8 g. (0.17 mole) of ethyl β-bromopropionate with 45.5 g. (0.163 mole) of 3-(4-nitrobenzoyl)-2-methylindole in 300 ml. of dry dimethylformamide in the presence of 7.05 g. (0.178 mole) of a 61 percent suspension of sodium hydride in mineral oil, and saponification of the resulting ethyl β-[3-(4-nitrobenzoyl)-2-methyl-1-indole] propionate, m.p. 92°–94°C. (uncorr.) (recrystallized from ethanol) all according to the procedure described above in Example 1B and C. The crude product was recrystallized from acetonitrile to give 10.3 g. of α-[3-(4-nitrobenzoyl)-2-methyl-1-indole]propionic acid, m.p. 244°–246°C. (uncorr.)

EXAMPLE 39

β-[3-(4-Aminobenzoyl)-2-methyl-1-indole]propionic acid [I: $R_1$ is H; $R_2$ is $CH_3$; $R_3$ is 4—$NH_2C_6H_4CO$; $R_4$ is H; Y is $CH_2CH_2$] was prepared by reduction with hydrogen over a palladium-on-charcoal catalyst of 30 g. (0.079 mole) of ethyl β-[3-(4-nitrobenzoyl)-2-methyl-1-indole]propionate described above in Example 38, using the procedure described above in Example 33A, and saponification of the resulting ethyl β-[3-(4-aminobenzoyl)-2-methyl-1-indole]-propionate. The crude product was recrystallized from acetonitrile to give 5.1 g. of β-[3-(4-aminobenzoyl)-2-methyl-1-indole]propionic acid, m.p. 228°–231°C. (uncorr.).

EXAMPLE 40

β-[3-(4-Dimethylaminobenzoyl)-2-methyl-1-indole]propionic acid [I: $R_1$ is H; $R_2$ is $CH_3$; $R_3$ is 4—$(CH_3)_2NC_6H_4CO$; $R_4$ is H; Y is $CH_2CH_2$]

A mixture of 20.3 g. (0.063 mole) of β-[3-(4-aminobenzoyl)-2-methyl-1-indole]propionic acid, 16.6 g. (0.19 mole) of 34 percent formalin, and 3 g. of 10 percent palladium-on-charcoal in 250 ml. of methanol was shaken with hydrogen in a Parr shaker under a pressure of about 50 pounds p.s.i. When reduction was complete, the catalyst was removed by filtration, the filtrate was taken to dryness, and the residue recrystallized from ethyl acetate to give 16.5 g. of β-[3-(4-dimethylaminobenzoyl)-2-methyl-1-indole]propionic acid, m.p. 169°–171.5°C. (uncorr.).

EXAMPLE 41

α-[3-(4-Dimethylaminobenzoyl)-2-methyl-1-indole]acetic acid [I: $R_1$ is H; $R_2$ is $CH_3$; $R_3$ is 4—$(CH_3)_2NC_6H_4CO$; $R_4$ is H; Y is $CH_2$] is prepared by reducing with hydrogen over a palladium-on-charcoal catalyst a mixture of α-[3-(4-aminobenzoyl)-2-methyl-1-indole]acetic acid and formaldehyde and isolation of the product from a neutral medium all according to the procedure described above in Example 40.

EXAMPLE 42

A. 3-(4-t-Butylbenzoyl)-2-methylindole [II: $R_2$ is $CH_3$; $R_3$ is 4—$(CH_3)_3CC_6H_4CO$; $R_4$ is H] is prepared by reaction, in dry ether or tetrahydrofuran, of 4-t-butylbenzoyl chloride with the Grignard reagent prepared from 2-methylindole and methyl magnesium bromide using the procedure described above in Example 1A.

B. α-[3-(4-t-Butylbenzoyl)-2-methyl-1-indole]acetic acid [I: $R_1$ is H; $R_2$ is $CH_3$; $R_3$ is 4—$(CH_3)_3CC_6H_4CO$; $R_4$ is H; Y is $CH_2$] is prepared by reaction of ethyl bromoacetate with 3-(4-t-butyl-benzoyl)-2-methylindole in dry dimethylformamide in the presence of sodium hydride, and saponification of the resulting ethyl α-[3-(4-t-butylbenzoyl)-2-methyl-1-indole]acetate all according to the procedure described above in Example 1B and C.

EXAMPLE 43

β-[3-(4-t-Butylbenzoyl)-2-methyl-1-indole]propionic acid [I: $R_1$ is H; $R_2$ is $CH_3$; $R_3$ is 4—$(CH_3)_3CC_6H_4CO$; $R_4$ is H; Y is $CH_2CH_2$] was prepared by reaction of 9.0 g. (0.099 mole) of ethyl β-bromopropionate with 27.5 g. (0.095 mole) of 3-(4-t-butylbenzoyl)-2-methylindole in 100 ml. of dry dimethylformamide in the presence of 4.15 g. (0.10 mole) of a 60 percent suspension of sodium hydride in mineral oil, and saponification of the resulting ethyl β-[3-(4-t-butylbenzoyl)-2-methyl-1-indole]propionate all according to the procedure described above in Example 1B and C. The crude product was recrystallized twice from benzene to give 16.5 g. of β-[3-(4-t-butylbenzoyl)-2-methyl-1-indole]propionic acid, m.p. 165.5°–168°C. (uncorr.).

EXAMPLE 44

A. 3-Benzoyl-2,5-dimethylindole [II: $R_2$ is $CH_3$; $R_3$ is $C_6H_5CO$; $R_4$ is 5—$CH_3$] was prepared by reaction, in dry ether, of 24.4 g. (0.17 mole) of benzoyl chloride with the Grignard reagent prepared from 25 g. (0.17 mole) of 2,5-dimethylindole and a molar equivalent of methyl magnesium bromide using the procedure described above in Example 1A. The crude product was recrystallized from isopropanol to give 24.1 g. of 3-benzoyl-2,5-dimethylindole, m.p. 217°–218°C. (uncorr.).

B. α-(3-Benzoyl-2,5-dimethyl-1-indole)acetic acid [I: $R_1$ is H; $R_2$ is $CH_3$; $R_3$ is $C_6H_5CO$; $R_4$ is 5—$CH_3$; Y is $CH_2$] is prepared by reaction of ethyl bromoacetate with 3-benzoyl-2,5-dimethylindole in dry dimethylformamide in the presence of sodium hydride and saponification of the resulting ethyl α-(3-benzoyl-2,5-dimethyl-1-indole)acetate all according to the procedure described above in Example 1B and C.

EXAMPLE 45

β-(3-Benzoyl-2,5-dimethyl-1-indole)propionic acid [I: $R_1$ is H; $R_2$ is $CH_3$; $R_3$ is $C_6H_5CO$; $R_4$ is 5—$CH_3$; Y is $CH_2CH_2$] was prepared by reaction of 18.8 g. (0.11 mole) of ethyl β-bromopropionate with 27.2 g. (0.11 mole) of 3-benzoyl-2,5-dimethylindole in 150 ml. of dry dimethylformamide in the presence of 4.8 g. (0.12 mole) of a 60 percent suspension of sodium hydride in mineral oil, and saponification of the resulting ethyl β-(3-benzoyl-2,5-dimethyl-1-indole)-propionate all according to the procedure described above in Example 1B and C. The crude product was recrystallized from acetonitrile to give 17.5 g. of β-(3-benzoyl-2,5-dimethyl-1-indole)-propionic acid, m.p. 212°–214°C. (uncorr.).

EXAMPLE 46

A. 3-(2-Furoyl)-2-methyl-6-hydroxyindole [II: $R_2$ is $CH_3$; $R_3$ is $2-C_4H_3O-CO$; $R_4$ is 6—HO] is prepared by reaction, in dry ether or tetrahydrofuran, of 2-furancarbonyl chloride with the Grignard reagent prepared from 2-methyl-6-hydroxyindole and methyl magnesium bromide using the procedure described above in Example 1A.

B. γ-[3-(2-Furoyl)-2-methyl-6-hydroxy-1-indole]butyric acid [I: $R_1$ is H; $R_2$ is $CH_3$; $R_3$ is $2-C_4H_3O-CO$; $R_4$ is 6—HO; Y is $(CH_2)_3$] is prepared by reaction of ethyl γ-bromobutyrate with 3-(2-furoyl)-2-methyl-6-hydroxyindole in dry dimethylformamide in the presence of sodium hydride, and saponification of the resulting ethyl γ-[3-(2-furoyl)-2-methyl-6-hydroxy-1-indole]butyrate all according to the procedure described above in Example 1B and C.

EXAMPLE 47

A. 3-(2-pyridinecarbonyl)-2-ethylindole [II: $R_2$ is $C_2H_5$; $R_3$ is $2-C_5H_4N-CO$; $R_4$ is H] is prepared by reaction, in dry ether or tetrahydrofuran, of 2-pyridinecarbonyl chloride with the Grignard reagent prepared from 2-ethylindole and methyl magnesium bromide using the procedure described above in Example 1A.

B. α-[3-(2-Pyridinecarbonyl)-2-ethyl-1-indole]acetic acid [I: $R_1$ is H; $R_2$ is $C_2H_5$; $R_3$ is $2-C_5H_4N-CO$; $R_4$ is H; Y is $CH_2$] is prepared by reaction of ethyl bromoacetate with 3-(2-pyridinecarbonyl)-2-ethylindole in dry dimethylformamide in the presence of sodium hydride, and saponification of the resulting ethyl α-[3-(2-pyridinecarbonyl)-2-ethyl-1-indole]acetate all according to the procedure described above in Example 1B and C.

EXAMPLE 48

A. 3-(3-Pyridinecarbonyl)-2-methyl-6-trifluoromethylindole [II: $R_2$ is $CH_3$; $R_3$ is $3-C_5H_4N-CO$; $R_4$ is 6-$CF_3$] is prepared by reaction, in dry ether or tetrahydrofuran, of 3-pyridinecarbonyl chloride with the Grignard reagent prepared from 2-methyl-6-trifluoromethylindole and methyl magnesium iodide using the procedure described above in Example 1A.

B. α-[3-(3-Pyridinecarbonyl)-2-methyl-6-trifluoromethyl-1-indole]-acetic acid [I: $R_1$ is H; $R_2$ is $CH_3$; $R_3$ is $3-C_5H_4N-CO$; $R_4$ is 6—$CF_3$; Y is $CH_2$] is prepared by reaction of ethyl bromoacetate with 3-(3-pyridinecarbonyl)-2-methyl-6-trifluoromethylindole in dry dimethylformamide in the presence of sodium hydride, and saponification of the resulting ethyl α-[3-(3-pyridinecarbonyl)-2-methyl-6-trifluoromethyl-1-indole]acetate all according to the procedure described above in Example 1B and C.

EXAMPLE 49

A. 3-(4-Pyridinecarbonyl)-2-methyl-5,6-methylenedioxyindole [II: $R_2$ is $CH_3$; $R_3$ is $4-C_5H_4N-CO$; $R_4$ is 5,6—$OCH_2O$] is prepared by reaction, in dry ether or tetrahydrofuran, of 4-pyridinecarbonyl chloride with the Grignard reagent prepared from 2-methyl-5,6-methylenedioxyindole and methyl magnesium bromide using the procedure described above in Example 1A.

B. α-[3-(4-Pyridinecarbonyl)-2-methyl-5,6-methylenedioxy-1-indole]-acetic acid [I: $R_1$ is H; $R_2$ is $CH_3$; $R_3$ is $4-C_5H_4N-CO$; $R_4$ is 5,6-$OCH_2O$; Y is $CH_2$] is prepared by reaction of ethyl bromoacetate with 3-(4-pyridinecarbonyl)-2-methyl-5,6-methylenedioxyindole in dry dimethylformamide in the presence of sodium hydride, and saponification of the resulting ethyl α-[3-(4-pyridinecarbonyl)-2-methyl-5,6-methylenedioxy-1-indole]acetate all according to the procedure described above in Example 1B and C.

EXAMPLE 50

A. 3-(4-Isoxazolecarbonyl)-2-methyl-5,6-ethylenedioxyindole [II: $R_2$ is $CH_3$; $R_3$ is $4-C_3H_2NO-CO$; $R_4$ is 5,6—$OCH_2CH_2O$] is prepared by reaction, in dry ether or tetrahydrofuran, of 4-isoxazolecarbonyl chloride with the Grignard reagent prepared from 2-methyl-5,6-ethylenedioxyindole and methyl magnesium bromide using the procedure described above in Example 1A.

B. α-[3-(4-Isoxazolecarbonyl)-2-methyl-5,6-ethylenedioxy-1-indole]-acetic acid [I: $R_1$ is H; $R_2$ is $CH_3$; $R_3$ is $4-C_3H_2NO-CO$; $R_4$ is 5,6—$OCH_2CH_2O$; Y is $CH_2$] is prepared by reaction of ethyl bromoacetate with 3-(4-isoxazolecarbonyl)-2-methyl-5,6-ethylenedioxyindole in dry dimethylformamide in the presence of sodium hydride, and saponification of the resulting ethyl α-[3-(4-isoxazolecarbonyl)-2-methyl-5,6-ethylenedioxy-1-indole]acetate all according to the procedure described above in Example 1B and C.

EXAMPLE 51

A. 3-(4-Thiazolecarbonyl)-2-methylindole [II: $R_2$ is $CH_3$; $R_3$ is $4-C_3H_2NS-CO$; $R_4$ is H] is prepared by reaction, in dry ether or tetrahydrofuran, of 4-thiazolecarbonyl chloride with the Grignard reagent prepared from 2-methyindole and methyl magnesium bromide using the procedure described above in Example 1A.

B. α-[3-(4-Thiazolecarbonyl)-2-methyl-1-indole]acetic acid [I: $R_1$ is H; $R_2$ is $CH_3$; $R_3$ is 4—$C_3H_2NS$-CO; $R_4$ is H; Y is $CH_2$] is prepared by reaction of ethyl bromoacetate with 3-(4-thiazolecarbonyl)-2-methylindole in dry dimethylformamide in presence of sodium hydride, and saponification of the resulting ethyl α-[3-(4-thiazolecarbonyl)-2-methyl-1-indole]acetate all according to the procedure described above in Example 1B and C.

EXAMPLE 52

A. 3-(5-Thiazolecarbonyl)-2-methylindole [II: $R_2$ is $CH_3$; $R_3$ is 5—$C_3H_2NS$—CO; $R_4$ is H] is prepared by reaction, in dry ether or tetrahydrofuran, of 5-thiazolecarbonyl chloride with the Grignard reagent prepared from 2-methylindole and methyl magnesium bromide using the procedure described above in Example 1A.

B. α-[3-(5-Thiazolecarbonyl)-2-methyl-1-indole]acetic acid [I: $R_1$ is H; $R_2$ is $CH_3$; $R_3$ is 5—$C_3H_2$-NS—CO; $R_4$ is H; Y is $CH_2$] is prepared by reaction of ethyl bromoacetate with 3-(5-thiazolecarbonyl)-2-methylindole in dry dimethylformamide in the presence of sodium hydride, and saponification of the resulting ethyl α-[3-(5-thiazolecarbonyl)-2-methyl-1-indole]acetate all according to the procedure described above in Example 1B and C.

EXAMPLE 53

A. 3-(4-Isothiazolecarbonyl)-2-methylindole [II: $R_2$ is $CH_3$; $R_3$ is 4—$C_3H_2NS$—CO; $R_4$ is H] is prepared by reaction, in dry ether or tetrahydrofuran, of 4-isothiazolecarbonyl chloride with the Grignard reagent prepared from 2-methylindole and methyl magnesium bromide using the procedure described above in Example 1A.

B. α-[3-(4-Isothiazolecarbonyl)-2-methyl-1-indole]acetic acid [I: $R_1$ is H; $R_2$ is $CH_3$; $R_3$ is 4—$C_3H_2$-NS—CO; $R_4$ is H; Y is $CH_2$] is prepared by reaction of ethyl bromoacetate with 3-(4-isothiazolecarbonyl)-2-methylindole in dry dimethylformamide in the presence of sodium hydride, and saponification of the resulting ethyl G2a-[3-(4-isothiazolecarbonyl)-2-methyl-1-indole]acetate all according to the procedure described above in Example 1B and C.

EXAMPLE 54

A. 3-(5-Isothiazolecarbonyl)-2-methylindole [II: $R_2$ is $CH_3$; $R_3$ is 5—$C_3H_2NS$—CO; $R_4$ is H] is prepared by reaction, in dry ether or tetrahydrofuran, of 5-isothiazolecarbonyl chloride with the Grignard reagent prepared from 2-methylindole and methyl magnesium bromide using the procedure described above in Example 1A.

B. α-[3-(5-Isothiazolecarbonyl)-2-methyl-1-indole]acetic acid [I: $R_1$ is H; $R_2$ is $CH_3$; $R_3$ is 5—$C_3H_2$-NS—CO; $R_4$ is H; Y is $CH_2$] is prepared by reaction of ethyl bromoacetate with 3-(5-isothiazolecarbonyl)-2-methylindole in dry dimethylformamide in the presence of sodium hydride, and saponification of the resulting ethyl a-β-(5-isothiazolecarbonyl)-2-methyl-1-indole]acetate all according to the procedure described above in Example 1B and C.

EXAMPLE 55

A. 3-(α-Phenylacetyl)-2-methylindole [II: $R_2$ is $CH_3$; $R_3$ is $C_6H_5CH_2CO$; $R_4$ is H] is prepared by reaction, in dry ether or tetrahydrofuran, of phenylacetyl chloride with the Grignard reagent prepared from 2-methylindole and methyl magnesium bromide using the procedure described above in Example 1A.

B. α-[3-(3-(α-Phenylacetyl)-2-methyl-1-indole]acetic acid [I: $R_1$ is H; $R_2$ is $CH_3$; $R_3$ is $C_6H_5CH_2CO$; $R_4$ is H; Y is $CH_2$] is prepared by reaction of ethyl bromoacetate with 3-(α-phenylacetyl)-2-methylindole in dry dimethylformamide in the presence of sodium hydride, and saponification of the resulting ethyl α-[3-(α-phenylacetyl)-2-methyl-1-indole]acetate all according to the procedure described above in Example 1B and C.

EXAMPLE 56

A. 2-Methyl-3-phenylindole [II: $R_2$ is $CH_3$; $R_3$ is $C_6H_5$; $R_4$ is H]

A mixture of 21.6 g. (0.2 mole) of phenylhydrazine, 26.8 g. (0.2 mole) of phenylacetone, and 50 ml. of a solution of concentrated aqueous hydrochloric acid in 100 ml. of absolute ethanol, the whole dissolved in 300 ml. of absolute ethanol, was refluxed on a steam bath for 2 hours, the mixture concentrated to a small volume in vacuo, and the resulting green sludge taken up in water/ether. The organic phase was washed twice with water, and the resulting orange solution was dried and charcoaled. The pale yellow filtrate was taken to dryness in vacuo, and the residual yellow viscous gum distilled in vacuo at 0.5 mm., the product being collected at 143°–152°C. There was thus obtained 34 g. of 2-methyl-3-phenylindole as a yellow viscous oil.

B. Ethyl α-(2-methyl-3-phenyl-1-indole)acetate [I: $R_1$ is $C_2H_5$; $R_2$ is $CH_3$; $R_3$ is $C_6H_5$; $R_4$ is H; Y is $CH_2$] was prepared by reacting 33.6 g. (0.20 mole) of ethyl bromoacetate with 37 g. (0.18 mole) of 2-methyl-3-phenylindole in the presence of 7.8 g. (0.20 mole) of a 62 percent suspension of sodium hydride in mineral oil in 250 ml. of dimethylformamide using the procedure described above in Example 1B. There was thus obtained 47 g. of ethyl α-(2-methyl-3-phenyl-1-indole)acetate as a pale yellow oil.

C. α-(2-Methyl-3-phenyl-1-indole)acetic acid [I: $R_1$ is H; $R_2$ is $CH_3$; $R_3$ is $C_6H_5$; $R_4$ is H; Y is $CH_2$] was prepared by saponifying 47 g. (0.16 mole) of ethyl α-(2-methyl-3-phenyl-1-indole)-acetate in a solution containing 400 ml. of ethanol and 100 ml. of 35 percent aqueous sodium hydroxide using the procedure described above in Example 1C. The crude product was recrystallized from benzene giving 26 g. of α-(2-methyl-3-phenyl-1-indole)acetic acid, m.p. 159°–167°C. (dec.).

In psychomotor activity studies in mice, α-(2-methyl-3-phenyl-1-indole)acetic acid was found to depress 74 percent of the motor activity of the test animals at a dose of 300 mg./kg. (p.o.). Psychomotor depressant activity was determined in standard activity cages using the method of Dews, Brit. J. Pharmacol. 8, 46 (1953) in which mice, medicated with the test compound, are

EXAMPLE 57

A. 3-(4-Chlorophenyl)-2-methylindole [II: $R_2$ is $CH_3$; $R_3$ is 4—$ClC_6H_4$; $R_4$ is H] was prepared by reacting 54 g. (0.5 mole) of phenylhydrazine with 84 g. (0.5 mole) of α-(4-chlorophenyl)-acetone in 750 ml. of absolute ethanol and in the presence of 125 ml. of concentrated hydrochloric acid dissolved in 250 ml. of absolute ethanol using the procedure described above in Example 56A. The crude product was recrystallized from cyclohexane giving 97 g. of 3-(4-chlorophenyl)-2-methylindole, m.p. 110°–111.5°C.

B. Ethyl α-[3-(4-chlorophenyl)-2-methyl-1-indole]acetate [I: $R_1$ is $C_2H_5$; $R_2$ is $CH_3$; $R_3$ is 4—$ClC_6H_4$; $R_4$ is H; Y is $CH_2$] was prepared by reacting 25 g. (0.15 mole) of ethyl bromoacetate with 30 g. (0.12 mole) of 3-(4-chlorophenyl)-2-methylindole in the presence of 5.8 g. (0.15 mole) of a 62 percent suspension of sodium hydride in mineral oil in 250 ml. of dimethylformamide using the procedure described above in Example 1B. There was thus obtained 45 g. of ethyl α-[3-(4-chlorophenyl)-2-methyl-1-indole]acetate as a brown oil.

C. α-[3-(4-Chlorophenyl)-2-methyl-1-indole]acetic acid [I: $R_1$ is H; $R_2$ is $CH_3$; $R_3$ is 4-$ClC_6H_4$; $R_4$ is H; Y is $CH_2$] was prepared by saponification of 46 g. (0.14 mole) of ethyl α-[3-(4-chlorophenyl)-2-methyl-1-indole]acetate in a solution of 400 ml. of ethanol and 125 ml. of 35 percent aqueous sodium hydroxide using the procedure described above in Example 1C. The crude product was recrystallized twice from ethanol giving 11.0 g. of α-[3-(4-chlorophenyl)-2-methyl-1-indole]acetic acid, m.p. 188°–202°C. (dec.).

EXAMPLE 58

A. Ethyl β-(3-phenyl-2-methyl-1-indole)propionate [I: $R_1$ is $C_2H_5$; $R_2$ is $CH_3$; $R_3$ is $C_6H_5$; $R_4$ is H; Y is $CH_2CH_2$] was prepared by reacting 33 g. (0.20 mole) of ethyl β-bromopropionate with 31.4 g. (0.15 mole) of 3-phenyl-2-methylindole in the presence of 7.1 g. (0.18 mole) of a 62 percent suspension of sodium hydride in mineral oil in 250 ml. of dimethylformamide using the manipulative procedure described above in Example 1B. There was thus obtained 46 g. of ethyl β-(3-phenyl-2-methyl-1-indole)propionate as a yellow oil.

B. β-(3-Phenyl-2-methyl-1-indole)propionic acid [I: $R_1$ is H; $R_2$ is $CH_3$; $R_3$ is $C_6H_5$; $R_4$ is H; Y is $CH_2CH_2$] was prepared by saponification of 46 g. (0.27 mole) of ethyl β-(3-phenyl-2-methyl-1-indole)propionate in a solution of 500 ml. of ethanol and 160 ml. of 10 percent aqueous sodium hydroxide using the procedure described above in Example 1C. The crude product was recrystallized from ethanol/water giving 21 g. of β-(3-phenyl-2-methyl-1-indole)propionic acid, m.p. 135°–137.5°C.

β-(3-Phenyl-2-methyl-1-indole)propionic acid, when tested as a psychomotor depressant as described above in Example 56C, was found to depress 75 percent of the motor activity of the test animals at a dose of 300 mg./kg. (p.o.).

EXAMPLE 59

A. Ethyl β-[3-(4-chlorophenyl)-2-methyl-1-indole]propionate [I: $R_1$ is $C_2H_5$; $R_2$ is $CH_3$; $R_3$ is 4—$ClC_6H_4$; $R_4$ is H; Y is $CH_2CH_2$] was prepared by reacting 20 g. (0.083 mole) of 3-(4-chlorophenyl)-2methylindole with 16.5 g. (0.091 mole) of ethyl β-bromopropionate in 150 ml. of dry dimethylformamide in the presence of 3.62 g. (0.092 mole) of a 61 percent suspension of sodium hydride in mineral oil using the procedure described above in Example 1B. There was thus obtained ethyl β-[3-(4-chlorophenyl)-2-methyl-1-indole]propionate.

B. β-[3-(4-Chlorophenyl)-2-methyl-1-indole]propionic acid [I: $R_1$ is H; $R_2$ is $CH_3$; $R_3$ is 4—$ClC_6H_4$; $R_4$ is H; Y is $CH_2CH_2$] was prepared by saponification of the ethyl β-[3-(4-chlorophenyl)-2-methyl-1-indole]propionate obtained above in Example 59A in a solution containing 30 g. of potassium hydroxide dissolved in 200 ml. of methanol using the procedure described above in Example 1C. The crude product was recrystallized from benzene giving 8.4 g. of β-[3-(4-chlorophenyl)-2-methyl-1-indole]propionic acid, m.p. 143.5°–145.5°C.

EXAMPLE 60

A. 3-(4-Hydroxybenzyl)-2-methylindole [II: $R_2$ is $CH_3$; $R_3$ is 4—$HOC_6H_4CH_2$; $R_4$ is H] is prepared by reacting 2-(4-hydroxyphenyl)-ethyl methyl ketone with phenylhydrazine in ethanol in the presence of hydrochloric acid using the procedure described above in Example 56A. The product is reacted with acetic anhydride in the presence of pyridine to give 3-(4-acetoxybenzyl)-2-methylindole [II: $R_2$ is $CH_3$; $R_3$ is 4—$CH_3COOC_6H_4CH_2$; $R_4$ is H].

B. α-[3-(4-Hydroxybenzyl)-2-methyl-1-indole]acetic acid [I: $R_1$ and $R_4$ are H; $R_2$ is $CH_3$; $R_3$ is 4—$HOC_6H_4CH_2$; Y is $CH_2$] is prepared by reacting ethyl bromoacetate with 3-(4-hydroxybenzyl)-2-methylindole in dry dimethylformamide in the presence of sodium hydride, and saponification of the resulting ethyl α-[3-(4-hydroxybenzyl)-2-methyl-1-indole]acetate all according to the procedure described above in Example 1B and C.

Similarly reaction of ethyl bromoacetate with 3-(4-acetoxybenzyl)-2-methylindole in dry dimethylformamide in the presence of sodium hydride affords ethyl α-[3-(4-acetoxybenzyl)-2-methyl-1-indole]acetate [I. $R_1$ is $C_2H_5$; $R_2$ is $CH_3$; $R_3$ is 4—$CH_3COOC_6H_4CH_2$; $R_4$ is H; Y is $CH_2$].

EXAMPLE 61

A. 3-Benzyl-2-methylindole [II: $R_2$ is $CH_3$; $R_3$ is $C_6H_5CH_2$; $R_4$ is H] is prepared by reacting 2-phenylethyl methyl ketone with phenylhydrazine in ethanol in the presence of hydrochloric acid using the procedure described above in Example 56A.

B. α-(3-Benzyl-2-methyl-1-indole)acetic acid [I: $R_1$ is H; $R_2$ is $CH_3$; $R_3$ is $C_6H_5CH_2$; $R_4$ is H; Y is $CH_2$] is prepared by reacting ethyl bromoacetate with 3-benzyl-2-methylindole in dry dimethylformamide in the presence of sodium hydride, and saponification of the resulting ethyl α-(3-benzyl-2-methyl-1-indole)acetate all according to the procedure described above in Example 1B and C.

EXAMPLE 62

A. 3-(4-Chlorobenzyl)-2-methylindole [II: $R_2$ is $CH_3$; $R_3$ is 4—$ClC_6H_4CH_2$; $R_4$ is H]

In two separate runs, 25 g. (0.093 mole) and 40 g. (0.15 mole) of 3-(4-chlorobenzoyl)-2-methylindole, dissolved in 250 ml. and 350 ml. portions, respectively, of tetrahydrofuran was added in each case to a solution containing 0.25 mole of diborane in 250 ml. of tetrahydrofuran. The reaction mixtures were refluxed in each case for 1½ hours, cooled to room temperature, and the excess diborane destroyed by the addition of a small amount of water. The two solutions where then combined, taken to dryness in vacuo, the residual material taken up in about 1.5 liters of ethyl acetate, the organic solution washed with water, then with brine, dried, and taken to dryness giving 64 g. of 3-(4-chlorobenzyl)-2-methylindole.

B. Ethyl α-[3-(4-chlorobenzyl)-2-methyl-1-indole]acetate [I: $R_1$ is $C_2H_5$; $R_2$ is $CH_3$; $R_3$ is 4—$ClC_6H_4CH_2$; $R_4$ is H; Y is $CH_2$] was prepared by reaction of ethyl bromoacetate with 18.4 g. (0.11 mole) of 3-(4-chlorobenzyl)-2-methylindole in the presence of 5.1 g. (0.11 mole) of a 52 percent suspension of sodium hydride in mineral oil in 250 ml. of dry dimethylformamide using the procedure described above in Example 1B. There was thus obtained 30 g. of ethyl α-[3-(4-chlorobenzyl)-2-methyl-1-indole]acetic acid as a red-brown oil.

C. α-[3-(4-Chlorobenzyl)-2-methyl-1-indole]acetic acid [I: $R_1$ is H; $R_2$ is $CH_3$; $R_3$ is 4—$ClC_6H_4CH_2$; $R_4$ is H; Y is $CH_2$] was prepared by saponification of 30 g. (0.088 mole) of ethyl α-[3-(4-chlorobenzyl)-2-methyl-1-indole]acetate in a solution of 800 ml. of ethanol and 200 ml. of 10 percent aqueous sodium hydroxide using the procedure described above in Example 1C. The crude product was recrystallized from benzene giving 7.3 g. of α-[3-(4-chlorobenzyl)-2-methyl-1-indole]acetic acid, m.p. 202°–205°C.

EXAMPLE 63

Sodium β-(3-benzoyl-2-methyl-1-indole)propionate [Ia: $R_1$ is Na; $R_2$ is $CH_3$; $R_3$ is $C_6H_5CO$; Y is $CH_2CH_2$]

Seven grams (0.023 mole) of β-(3-benzoyl-2-methyl-1-indole)propionic acid were dissolved in the minimum amount of dimethylformamide, the pH of the solution was adjusted to 10 with 10 percent aqueous sodium hydroxide, the mixture was warmed to 50°C. and diluted with 100 ml. of hot water. On cooling, the product separated as a crystalline solid which was collected, washed with water, then with acetone and recrystallized from methanol/acetone to give 3.6 g. of sodium β-(3-benzoyl-2-methyl-1-indole)propionate.

EXAMPLE 64

β-[3-(4-Acetylaminobenzoyl)-2-methyl-1-indole]propionic acid [I: $R_1$ is H; $R_2$ is $CH_3$; $R_3$ is 4—$CH_3CONHC_6H_4CO$; $R_4$ is H; Y is $CH_2CH_2$]

A mixture of 6.3 g. (0.018 mole) of ethyl β-[3-(4-aminobenzoyl)-2-methyl-1-indole]propionate and 25 ml. of acetic anhydride was warmed to 60°C. on a steam bath. The mixture, which deposited a copious precipitate, was treated with water, heated to reflux, cooled, and the solid which separated was collected and washed with water to give 11 g. of a cream colored solid. The latter was recrystallized from ethanol to give 6.0 g. of ethyl β[3-(4-acetylaminobenzoyl)-2-methyl-1-indole]propionate, m.p. 188°–190°C. The latter was saponified in sodium hydroxide using the procedure described above in Example 1C, and the crude product recrystallized from acetonitrile to give β[3-(4-acetylaminobenzoyl)-2-methyl-1-indole]propionic acid, m.p. 10–213°C. (uncorr.).

EXAMPLE 65

γ-(3-Benzoyl-2-methyl-1-indole)butyric acid [Ia: $R_1$ is H; $R_2$ is $CH_3$; $R_3$ is $C_6H_5CO$; Y is $(CH_2)_3$] was prepared by reaction of 9.6 g. (0.05 mole) of ethyl γ-bromobutyrate with 11 g. (0.05 mole) of 3-benzoyl-2-methylindole in 80 ml. of dimethylformamide in the presence of 2.06 g. (0.05 mole) of a 60 percent suspension of sodium hydride using the procedure described above in Example 1B, and saponification of the resulting ethyl γ-(3-benzoyl-2-methyl-1-indole)butyrate, obtained as a brown gum, in 100 ml. of methanol containing 15 g. of potassium hydroxide using the procedure described above in Example 1C. The crude product was recrystallized two times from ethyl acetate to give 6.1 g. of γ-(3-benzoyl-2-methyl-1-indole)butyric acid, melts partly at 132°–135°C., melts completely at 151°–153° C.

EXAMPLE 66

γ-[3-(2-Furoyl)-2-methyl-6-acetoxy-1-indole]butyric acid [I: $R_1$ is H; $R_2$ is $CH_3$; $R_3$ is 2—$C_4H_3O$—CO; $R_4$ is 6-$CH_3COO$; Y is $(CH_2)_3$] is prepared by reaction of γ-[3-(2-furoyl)-2-methyl-6-hydroxy-1-indole]butyric acid with acetic anhydride in the presence of pyridine.

EXAMPLE 67

α-[3-(2-Thenoyl)-2-methyl-1-indole]propionic acid [I: $R_1$ is H; $R_2$ is $CH_3$; $R_3$ is 2—$C_4H_3SCO$; $R_4$ is H; Y is $CH_3CH$] was prepared by reaction of 10 g. (0.042 mole) of 3-(2-thenoyl)-2-methylindole with 7.5 g. (0.042 mole) of ethyl α-bromopropionate in 100 ml. of dry dimethylformamide in the presence of 1.65 g. of a 60 percent suspension of sodium hydride in mineral oil and saponification of the crude product, ethyl α-[3-(2-thenoyl)-2-methyl-1-indole]propionate, with methanolic alkali using the procedure described above in Example 1B and 1C. The product thus obtained was recrystallized from an ethyl acetate/benzene mixture giving 48 g. of α-[3-(2-thenoyl)-2-methyl-1-indole]propionic acid, m.p. 185-189°C.

EXAMPLE 68

A. 3-Benzoyl-2,4-dimethylindole [II: $R_2$ is $CH_3$; $R_3$ is $C_6H_5CO$; $R_4$ is 4—$CH_3$] was prepared by reaction of 14.0 g. (0.1 mole) of benzoyl chloride in 50 ml. of ether with the Grignard reagent prepared from 14.52 g. (0.1 mole) of 2,4-dimethylindole and 33 ml. (0.099 mole) of a 3M ether solution of ethyl magnesium bromide in a total volume of about 150 ml. of absolute ether using the procedure described above in Example 1A. There was thus obtained 14.2 g. of 3-benzoyl-2,4-dimethylindole, m.p. 174°–175°C. (uncorr.).

B. β-(3-Benzoyl-2,4-dimethyl-1-indole)propionic acid [I: $R_1$ is H; $R_2$ is $CH_3$; $R_3$ is $C_6H_5CO$; $R_4$ is 4—$CH_3$; Y is $CH_2CH_2$] was prepared by reacting 9 g. (0.036 mole) of 3-benzoyl-2,4-dimethylindole with 6.5 g. (0.06 mole) of ethyl β-bromopropionate in 100 ml. of dry dimethylformamide in the presence of 1.6 g. (0.04 mole) of a 60 percent suspension of sodium hydride in mineral oil and saponification of the resulting crude product, ethyl β-(3-benzoyl-2,4-dimethyl-1-indole)propionate, with methanolic alkali using the procedure described above in Example 1B and 1C. The product thus obtained was recrystallized twice from acetonitrile giving 6.64 g. of β-(3-benzoyl-2,4-dimethyl-1-indole)propionic acid, m.p. 187°–188°C. (uncorr.).

EXAMPLE 69

A. 3-(3,4-Dimethylbenzoyl)-2-methylindole [II: $R_2$ is $CH_3$; $R_3$ is 3,4—$(CH_3)_2C_6H_3CO$; $R_4$ is H] was prepared by reaction of 25.2 g. (0.15 mole) of 3,4-dimethylbenzoyl chloride in 50 ml. of ethyl ether with the Grignard reagent prepared from 19.6 g. (0.15 mole) of 2-methylindole and 52.5 ml. (0.16 mole) of a 3M ether solution of ethyl magnesium bromide in a total volume of about 200 ml. of absolute ether using the procedure described above in Example 1A. The crude product was recrystallized from ethyl acetate giving 18.9 g. of 3-(3,4-dimethylbenzoyl)-2-methylindole, m.p. 204°–207°C. (uncorr.).

B. β-[3-(3,4-Dimethylbenzoyl)-2-methyl-1-indole]propionic acid [I: $R_1$ is H; $R_2$ is $CH_3$; $R_3$ is 3,4—$(CH_3)_2C_6H_3CO$; $R_4$ is H; Y is $CH_2CH_2$] was prepared by reaction of 16 g. (0.06 mole) of 3-(3,4-dimethylbenzoyl)-2-methylindole with 11.6 g. (0.064 mole) of ethyl β-bromopropionate in 150 ml. of dimethylformamide in the presence of 2.66 g. (0.067 mole) of a 61 percent suspension of sodium hydride in mineral oil and saponification of the product, ethyl β-[-3-(3,4-dimethylbenzoyl)-2-methyl-1-indole]propionate, with methanolic sodium hydroxide using the procedure described above in Example 1B and 1C. The material thus obtained was recrystallized from acetonitrile giving 10.5 g. of β-[3-(3,4-dimethylbenzoyl)-2-methyl-1-indole]propionic acid, m.p. 182°–185°C. (uncorr.).

EXAMPLE 70

A. 3-(3,5-Dimethylbenzoyl)-2-methylindole [II: $R_2$ is $CH_3$; $R_3$ is 3,5—$(CH_3)_2C_6H_3CO$; $R_4$ is H] was prepared by reaction of 37.6 g. (0.2 mole) of 3,5-dimethylbenzoyl chloride in 100 ml. of ether with the Grignard reagent prepared from 26.2 g. (0.2 mole) of 2-methylindole and 70 ml. (0.21 mole) of a 3M ether solution of ethyl magnesium bromide in a total volume of about 270 ml. of absolute ether using the procedure described above in Example 1A. The crude product was recrystallized from ethyl acetate giving 30 g. of 3-(3,5-dimethylbenzoyl)-2-methylindole, m.p. 256°–258°C. (uncorr.).

B. β-[3-(3,5-Dimethylbenzoyl)-2-methyl-1-indole]propionic acid [I: $R_1$ is H; $R_2$ is $CH_3$; $R_3$ is 3,5—$(CH_3)_2C_6H_3CO$; $R_4$ is H; Y is $CH_2CH_2$] was prepared by reaction of 26 g. (0.1 mole) of 3-(3,5-dimethylbenzoyl)-2-methylindole with 19 g. (0.11 mole) of ethyl β-bromopropionate in 150 ml. of dimethylformamide in the presence of 4.35 g. (0.11 mole) of a 61 percent suspension of sodium hydride in mineral oil and saponification of the crude product, ethyl β-[3-(3,5-dimethylbenzoyl)-2-methyl-1-indole]propionate, with methanolic sodium hydroxide using the procedure described above in Example 1B and 1C. The material thus obtained was recrystallized from acetonitrile giving 14 g. of β-[3-(3,5-dimethylbenzoyl)-2-methyl-1-indole]propionic acid, m.p. 152°–154°C. (uncorr.).

EXAMPLE 71

A. 3-(4-Methyl-3-fluorobenzoyl)-2-methylindole [II: $R_2$ is $CH_3$; $R_3$ is 4—$CH_3$—3—$FC_6H_3CO$; $R_4$ is H] was prepared by reaction of 27.2 g. (0.16 mole) of 4-methyl-3-fluorobenzoyl chloride in 100 ml. of ether with the Grignard reagent prepared from 20.7 g. (0.16 mole) of 2-methylindole and 55 ml. (0.17 mole) of a 3M solution of ethyl magnesium bromide in absolute ether using the procedure described above in Example 1A. The crude product thus obtained was recrystallized from ethyl acetate giving 15.7 g. of 3-(4-methyl-3-fluorobenzoyl)-2-methylindole, m.p. 209°–210.5°C. (uncorr.).

B. β-[3-(4-Methyl-3-fluorobenzoyl)-2-methyl-1-indole]propionic acid [I: $R_1$ and $R_4$ are H; $R_2$ is $CH_3$; $R_3$ is 4—$CH_3$—3—$FC_6H_3CO$; Y is $CH_2CH_2$] was prepared by reaction of 19.55 g. (0.073 mole) of 3-(4-methyl-3-fluorobenzoyl)-2-methylindole with 13.9 g. (0.077 mole) of ethyl β-bromopropionate in 100 ml. of dry dimethylformamide in the presence of 3.2 g. (0.08 mole) of a 60 percent suspension of sodium hydride in mineral oil and saponification of the crude product, ethyl β-[3-(4-methyl-3-fluorobenzoyl)-2-methyl-1-indole]propionate, with methanolic alkali using the procedure described above in Example 1B and 1C. The crude product was isolated from an acidic medium and recrystallized from acetonitrile giving 17.3 g. of β-[3-(4-methyl-3-fluorobenzoyl)-2-methyl-1-indole] propionic acid, m.p. 193°–196°C. (uncorr.).

EXAMPLE 72

A. 3-(4-fluorobenzoyl)-2-methylindole [II: $R_2$ is $CH_3$; $R_3$ is 4—$FC_6H_4CO$; $R_4$ is H] was prepared by reaction of 25 g. (0.16 mole) of 4-fluorobenzoyl chloride in 150 ml. of absolute ether with the Grignard reagent prepared from 20.7 g. (0.16 mole) of 2-methylindole and 55 ml. (0.17 mole) of a 3M ether solution of ethyl magnesium bromide in a total of about 250 ml. of ether. The crude product was recrystallized from ethyl acetate to give 17 g. of 3-(4fluorobenzoyl)-2-methylindole as pink crystals.

B. β-[3-(4-Fluorobenzoyl)-2-methyl-1-indole]propionic acid [Ia: $R_1$ is H; $R_2$ is $CH_3$; $R_3$ is 4—$FC_6H_4CO$; Y is $CH_2CH_2$] was prepared by reacting 16.5 g. (0.065 mole) of 3-(4-fluorobenzoyl)-2-methylindole with 12.4 g. (0.068 mole) of ethyl β-bromopropionate in 75 ml. of dry dimethylformamide in the presence of 2.84 g. (0.072 mole) of a 61 percent suspension of sodium hydride in mineral oil and saponification of the crude product, ethyl β-[3-(4-fluorobenzoyl)-2-methyl-1-indole]propionate, with methanolic alkali using the procedure described above in Example 1B and 1C. The product was isolated from an acidic medium and recrystallized from acetonitrile giving 14.5 g. of β-[3-(4-fluorobenzoyl)-2-methyl-1-indole]propionic acid, m.p. 215°–219°C. (uncorr.).

EXAMPLE 73

A. 3-(3-Fluorobenzoyl)-2-methylindole [II: $R_2$ is $CH_3$; $R_3$ is 3—$FC_6H_4CO$; $R_4$ is H] was prepared by reaction of 31.6 g. (0.20 mole) of 3-fluorobenzoyl chloride in 100 ml. of absolute ether with the Grignard reagent prepared from 26.2 g. (0.20 mole) of 2-methylindole and 70 ml. (0.21 mole) of a 3M ether solution of ethyl magnesium bromide in a total of about 270 ml. of absolute ether using the procedure described in Example 1A. The crude product was recrystallized from ethyl acetate giving 23 g. of 3-(3-fluorobenzoyl)-2-methylindole as cream colored crystals.

B. β-[3-(3-Fluorobenzoyl)-2-methyl-1-indole]propionic acid [Ia: $R_1$ is H; $R_2$ is $CH_3$; $R_3$ is 3—$FC_6H_4CO$; Y is $CH_2CH_2$] was prepared by reacting 22.5 g. (0.089 mole) of 3-(3-fluorobenzoyl)-2-methylindole with 16.9 g. (0.093 mole) of ethyl β-bromopropionate in 100 ml. of dry dimethylformamide in the presence of 3.9 g. (0.098 mole) of a 61 percent suspension of the product, ethyl β-[3-(3-fluorobenzoyl)-2-methyl-1-indole]propionate, with methanolic alkali using the procedure described above in Example 1B and 1C. The product was isolated from an acidic medium and recrystallized from acetonitrile giving 15.7 g. of β-[3-(3-fluorobenzoyl)-2-methyl-1-indole]propionic acid, m.p. 179°–181.5°C. (uncorr.).

EXAMPLE 74

A. 3-(2,4,6-Trimethylbenzoyl)-2-methylindole [II: $R_2$ is $CH_3$; $R_3$ is 2,4,6—$(CH_3)_3C_6H_2CO$; $R_4$ is H] was prepared by reaction of 40 g. (0.22 mole) of 2,4,6-trimethylbenzoyl chloride in 50 ml. of ethyl ether with the Grignard reagent prepared from 28.8 g. (0.22 mole) of 2-methylindole and 77.5 ml. (0.23 mole) of a 3M ether solution of ethyl magnesium bromide in a total of about 275 ml. of absolute ether using the procedure described above in Example 1A. There was thus obtained 54 g. of 3-(2,4,6-trimethylbenzoyl)-2-methylindole, a small sample of which was recrystallized from ethyl acetate to give material of m.p. 261°–268°C. (uncorr.).

B. β-[3-(2,4,6-Trimethylbenzoyl)-2-methyl-1-indole]propionic acid [I: $R_1$ and $R_4$ are H; $R_2$ is $CH_3$; $R_3$ is 2,4,6—$(CH_3)_3C_6H_2CO$; Y is $CH_2CH_2$] was prepared by reacting 20 g. (0.073 mole) of 3-(2,4,6-trimethylbenzoyl)-2-methylindole with 13.8 g. (0.76 mole) of ethyl β-bromopropionate in 200 ml. of dry dimethylformamide in the presence of 3.16 g. (0.079 mole) of a 61 percent suspension of sodium hydride in mineral oil and saponification of the product, ethyl β-[-3-(2,4,6-trimethylbenzoyl)-2-methyl-1-indole]propionic acid, with methanolic alkali. The crude product was isolated from an acidic medium and recrystallized from acetonitrile giving 14.8 g. of β-[3-(2,4,6-trimethylbenzoyl)-2-methyl-1-indole]propionic acid, m.p. 150°-152.5°C. (uncorr.).

EXAMPLE 75

A. 3-(4-Ethylbenzoyl)-2-methylindole [II: $R_2$ is $CH_3$; $R_3$ is 4—$C_2H_5C_6H_4CO$; $R_4$ is H] was prepared by reaction of 29.7 g. (0.18 mole) of 4-ethylbenzoyl chloride in 150 ml. of absolute ether with the Grignard reagent prepared from 27.8 g. (0.211 mole) of 2-methylindole and 71 ml. (0.21 mole) of a 3M ether solution of ethyl magnesium bromide in a total of about 270 ml. of absolute ether using the procedure described above in Example 1A. The crude product was recrystallized from ethyl acetate giving 24 g. of 3-(4-ethylbenzoyl)-2-methylindole.

B. β-[3-(4-Ethylbenzoyl)-2-methyl-1-indole]propionic acid [I: $R_1$ and $R_4$ are H; $R_2$ is $CH_3$; $R_3$ is 4—$C_2H_5C_6H_4CO$; Y is $CH_2CH_2$] was prepared by reaction of 23 g. (0.088 mole) of 3-(4-ethylbenzoyl)-2-methylindole with 16.6 g. (0.092 mole) of ethyl β-bromopropionate in 150 ml. of dry dimethylformamide in the presence of 3.48 g. (0.096 mole) of a 60 percent suspension of sodium hydride in mineral oil and saponification of the product, ethyl β-[3-(4-ethylbenzoyl)-2-methyl-1-indole]propionate, with methanolic alkali using the procedure described above in Example 1B and 1C. The crude product was isolated from an acidic medium and recrystallized from ethyl acetate giving 13.7 g. of β-[3-(4-ethylbenzoyl)-2-methyl-1-indole]-propionic acid, m.p. 174°–177°C. (uncorr.).

EXAMPLE 76

A. 3-Cyclohexylcarbonyl-2-methylindole [II: $R_2$ is $CH_3$; $R_3$ is $C_6H_{11}CO$; $R_4$ is H] was prepared by reaction of 29.2 g. (0.2 mole) of cyclohexane carbonyl chloride with the Grignard reagent prepared from 26.2 g. (0.2 mole) of 2-methylindole and 73.5 ml. (0.22 mole) of a 3M ether solution of ethyl magnesium bromide in a total volume of about 275 ml. of absolute ether. The crude product was recrystallized from benzene giving 20.5 g. of 3-cyclohexylcarbonyl-2-methylindole as a cream colored solid.

B. β-[3-Cyclohexylcarbonyl-2-methyl-1-indole]propionic acid [I: $R_1$ and $R_4$ are H; $R_2$ is $CH_3$; $R_3$ is $C_6H_{11}CO$; Y is $CH_2CH_2$] was prepared by reaction of 20.5 g. (0.085 mole) of 3-cyclohexylcarbonyl-2-methylindole with 16.2 g. (0.089 mole) of ethyl β-bromopropionate in 150 ml. of dimethylformamide in the presence of 3.73 g. (0.094 mole) of a 60 percent suspension of sodium hydride in mineral oil and saponification of the resulting product, ethyl β-[3-cyclohexylcarbonyl-2-methyl-1-indole]propionate, with methanolic alkali using the procedure described above in Example 1B and 1C. The product thus obtained was recrystallized from acetonitrile giving 18 g. of β-[3-cyclohexylcarbonyl-2-methyl-1-indole]propionic acid, m.p. 163°–165°C. (uncorr.).

EXAMPLE 77

A. 3-(3-Methylbenzoyl)-2-methylindole [II: $R_2$ is $CH_3$; $R_3$ is 313 $CH_3C_6H_4CO$; $R_4$ is H] was prepared by reaction of 38.6 g. (0.25 mole) of 3-methylbenzoyl chloride in 100 ml. of diethyl ether with the Grignard reagent prepared from 32.9 g. (0.25 mole) of 2-methylindole and 92 ml. (0.28 mole) of a 3M ether solution of ethyl magnesium bromide in a total volume of about 300 ml. of diethyl ether. The crude product was recrystallized from acetonitrile giving 39 g. of 3-(3-methylbenzoyl)-2-methylindole.

B. β-[3-(3-Methylbenzoyl)-2-methyl-1-indole]propionic acid [I: $R_1$ and $R_4$ are H; $R_2$ is $CH_3$; $R_3$ is 3—$CH_3C_6H_4CO$; Y is $CH_2CH_2$] was prepared by reacting 38 g. (0.15 mole) of 3-(3-methylbenzoyl)-2-methylindole with 29 g. (0.16 mole) of ethyl β-bromopropionate in 200 ml. of dimethylformamide in the presence of 6.7 g. (0.17 mole) of a 60 percent suspension of sodium hydride in mineral oil and saponification of the resulting ester, ethyl β-[3-(3-methylbenzoyl)-2-methyl-1-indole[propionate, with methanolic alkali using the procedure described above in Example 1B and 1C. Recrystallization of the crude product thus obtained from acetonitrile gave 24.6 g. of β-[3-(3-methylbenzoyl)-2-methyl-1-indole]propionic acid, m.p. 170°–173°C. (uncorr.).

EXAMPLE 78

A. 3-(3,4-Dimethoxybenzoyl)-2-methylindole [II: $R_2$ is

CH$_3$; R$_3$ is 3,4—(CH$_3$O)$_2$C$_6$H$_3$CO; R$_4$ is H] was prepared by reaction of 90 g. (0.45 mole) of 3,4-dimethoxybenzoyl chloride in 150 ml. of tetrahydrofuran with the Grignard reagent prepared from 59 g. (0.45 mole) of 2-methylindole and 165 ml. (0.50 mole) of a 3M ether solution of ethyl magnesium bromide in a total of 565 ml. of absolute ether. The crude product was recrystallized once from ether and once from benzene giving 47 g. of 3-(3,4-dimethoxybenzoyl)-2-methylindole.

B. β-[3-(3,4-Dimethoxybenzoyl)-2-methyl-1-indole]propionic acid [Ia: R$_1$ is H; R$_2$ is CH$_3$; R$_3$ is 3,4—(CH$_3$O)$_2$C$_6$H$_3$CO; Y is CH$_2$CH$_2$] was prepared by reaction of 47 g. (0.16 mole) of 3-(3,4-dimethoxybenzoyl)-2-methylindole with 30.8 g. (0.17 mole) of ethyl β-bromopropionate in 150 ml. of dry dimethylformamide in the presence of 7 g. (0.18 mole) of a 60 percent suspension of sodium hydride in mineral oil and saponification of the resulting ester, ethyl β-[3-(3,4-dimethoxybenzoyl)-2-methyl-1-indole]propionate, with methanolic alkali using the procedure described above in Example 1B and 1C. The crude product thus obtained was recrystallized from benzene giving 11.3 g. of β-[3-(3,4-dimethoxybenzoyl)-2-methyl-1-indole]propionic acid, m.p. 143°–145.5°C. (uncorr.).

EXAMPLE 79

A. 3-(1-Adamantanecarbonyl)-2-methylindole [II: R$_2$ is CH$_3$; R$_3$ is 1-adamantane-CO; R$_4$ is H] was prepared by reaction of 25 g. (0.13 mole) of 1-adamantanecarboxylic acid chloride in 150 ml. of ether with the Grignard reagent prepared from 20.7 g. (0.16 mole) of 2-methylindole and 55 ml. (0.17 mole) of a 3M ether solution of ethyl magnesium bromide in a total of about 300 ml. of absolute ether using the procedure described above in Example 1A. The crude product was recrystallized once from an ether/hexane mixture and once from benzene giving 6.9 g. of 3-(1-adamantanecarbonyl)-2-methylindole, m.p. 155°–158°C. (uncorr.).

B. β-[3-(1-Adamantanecarbonyl)-2-methyl-1-indole]propionic acid [I: R$_1$ and R$_4$ are H; R$_2$ is CH$_3$; R$_3$ is 1-adamantane-CO; Y is CH$_2$CH$_2$] was prepared by reaction of 11.5 g. (0.039 mole) of 3-(1-adamantanecarbonyl)-2-methylindole with 7.45 g. (0.041 mole) of ethyl β-bromopropionate in 100 ml. of dry dimethylformamide in the presence of 1.72 g. (0.43 mole) of a 60 percent suspension of sodium hydride in mineral oil and saponification of the resulting ester, ethyl β-[3-(1-adamantanecarbonyl)-2-methyl-1-indole]propionate, with methanolic alkali using the procedure described above in Example 1B and 1C. The crude product was recrystallized from benzene giving 4.6 g. of β-[3-(1-adamantanecarbonyl)-2-methyl-1-indole]propionic acid, m.p. 169°–171°C. (uncorr.).

EXAMPLE 80

A. 3-(4-Biphenylcarbonyl)-2-methylindole [II: R$_2$ is CH$_3$; R$_3$ is 4—C$_6$H$_5$—C$_6$H$_4$CO; R$_4$ is H] was prepared by reaction of 43.2 g. (0.20 mole) of 4-biphenylcarbonyl chloride in 200 ml. of tetrahydrofuran with the Grignard reagent prepared from 26.2 g. (0.2 mole) of 2-methylindole and 73.5 ml. (0.22 mole) of a 3M solution of ethyl magnesium bromide in a total of about 275 ml. of dry ether. The crude product was recrystallized from acetonitrile giving 22 g. of 3-(4-biphenylcarbonyl)-2-methylindole, m.p. 222°–224°C. (uncorr.).

B. β-[3-(4-Biphenylcarbonyl)-2-methyl-1-indole]propionic acid [I: R$_1$ and R$_4$ are H; R$_2$ is CH$_3$; R$_3$ is 4—C$_6$H$_5$—C$_6$H$_4$CO; Y is CH$_2$CH$_2$] was prepared by reaction of 21 g. (0.068 mole) of 3-(4-biphenylcarbonyl)-2-methylindole with 12.8 g. (0.071 mole) of ethyl β-bromopropionate in 100 ml. of dimethylformamide in the presence of 2.96 g. (0.074 mole) of a 60 percent suspension of sodium hydride in mineral oil and saponification of the resulting ester, ethyl β-[3-(4-biphenylcarbonyl)-2-methyl-1-indole]propionate, with methanolic alkali using the procedure described above in Example 1B and 1C. The crude product thus obtained was recrystallized twice from acetonitrile giving 16.5 g. of β-[3-(4-biphenylcarbonyl)-2-methyl-1-indole]propionic acid, m.p. 171.5°–174°C. (uncorr.).

EXAMPLE 81

A. 3-Cyclopentylcarbonyl-2-methylindole [II: R$_2$ is CH$_3$; R$_3$ is C$_5$H$_9$CO; R$_4$ is H] was prepared by reaction of 34 g. (0.26 mole) of cyclopentane carboxylic acid chloride with the Grignard reagent prepared from 40 g. (0.31 mole) of 2-methylindole and 107 ml. (0.32 mole) of a 3M ether solution of ethyl magnesium bromide in a total of about 300 ml. of absolute ether using the procedure described above in Example 1A. The crude product was recrystallized from benzene giving 15 g. of 3-cyclopentylcarbonyl-2-methylindole as an off-white solid.

B. β-[3-Cyclopentylcarbonyl-2-methyl-1-indole]propionic acid [I: R$_1$ and R$_4$ are H; R$_2$ is CH$_3$; R$_3$ is C$_5$H$_9$CO; Y is CH$_2$CH$_2$] was prepared by reaction of 22.1 g. (0.097 mole) of 3-cyclopentylcarbonyl-2-methylindole with 18.5 g. (0.102 mole) of ethyl β-bromopropionate in 150 ml. of dimethylformamide in the presence of 4.27 g. (0.107 mole) of a 60 percent suspension of sodium hydride in mineral oil and saponification of the resulting ester, ethyl β-[3-cyclopentylcarbonyl-2-methyl-1-indole]propionate, with methanolic alkali using the procedure described above in Example 1B and 1C. The crude product thus obtained was recrystallized from a benzene/hexane mixture giving 8.5 g. of β-[3-cyclopentylcarbonyl-2-methyl-1-indole]propionic acid, m.p. 138°–140.5°C. (uncorr.).

EXAMPLE 82

A. 3-(2,4-Dimethoxybenzoyl)-2-methylindole [II: R$_2$ is CH$_3$; R$_3$ is 2,4—(CH$_3$O)$_2$C$_6$H$_3$CO; R$_4$ is H] was prepared by reaction of 83 g. (0.42 mole) of 2,4-dimethoxybenzoyl chloride with the Grignard reagent prepared from 54.5 g. (0.42 mole) of 2-methylindole and 152 ml. (0.46 mole) of a 3M ether solution of ethyl magnesium bromide in a total of about 550 ml. of absolute ether using the procedure described above in Example 1A. The crude product was recrystallized from acetonitrile giving 50 g. of 3-(2,4-dimethoxybenzoyl)-2-methylindole.

B. β-[3-(2,4-Dimethoxybenzoyl)-2-methyl-1-indole]propionic acid [Ia: R$_1$ is H; R$_2$ is CH$_3$; R$_3$ is 2,4—(CH$_3$O)$_2$C$_6$H$_3$CO; Y is CH$_2$CH$_2$] was prepared by reaction of 49 g. (0.17 mole) of 3-(2,4-dimethoxybenzoyl)-2-methylindole with 22.3 ml. (0.17 mole) of ethyl βbromopropionate in 200 ml. of dry dimethylformamide in the presence of 7.3 g. (0.18 mole) of a 60 percent suspension of sodium hydride in mineral oil and saponification of the resulting ester, ethyl β-[3-(2,4-dimethoxybenzoyl)-2-methyl-1-indole]propionate, with methanolic alkali using the procedure described above in Example 1B and 1C. The crude product thus obtained was recrystallized from acetonitrile giving 10.5 g. of β-[3-(2,4-dimethoxybenzoyl)-2-methyl-1-indole]propionic acid, m.p. 194°–196.5°C. (uncorr.).

EXAMPLE 83

A. 3-(4-Methylbenzoyl)-2,5-dimethylindole [II: $R_2$ is $CH_3$; $R_3$ is 4—$CH_3C_6H_4CO$; $R_4$ is 5—$CH_3$] was prepared by reacting 26.6 g. (0.17 mole) of 4-methylbenzoyl chloride with the Grignard reagent prepared from 25 g. (0.17 mole) of 2,5-dimethylindole and 51.7 ml. of a 3M ether solution of ethyl magnesium bromide in a total volume of about 350 ml. of anhydrous ether using the procedure described above in Example 1A. The crude product was recrystallized from isopropanol giving 27.2 g. of 3-(4-methylbenzoyl)-2,5-dimethylindole, m.p. 231°–232°C. (uncorr.).

B. β-[3-(4-Methylbenzoyl)-2,5-dimethyl-1-indole]propionic acid [I: $R_1$ is H; $R_2$ is $CH_3$; $R_3$ is 4—$CH_3C_6H_4CO$; $R_4$ is 5—$CH_3$; Y is $CH_2CH_2$] was prepared by reaction of 26.33 g. (0.1 mole) of 3-(4-methylbenzoyl)-2,5-dimethylindole with 18.2 g. (0.1 mole) of ethyl β-bromopropionate in 150 ml. of dry dimethylformamide in the presence of 4.4 g. (0.11 mole) of a 60 percent suspension of sodium hydride in mineral oil and saponification of the resulting ester, ethyl β-[3-(4-methylbenzoyl)-2,5-dimethyl-1-indole]propionate, with methanolic alkali using the procedure described above in Example 1B. The crude product was purified by dissolving in dilute ammonium hydroxide and reprecipitating from an acidified medium. There was thus obtained 10 g. of β-[3-(4-methylbenzoyl)-2,5-dimethyl-1-indole]propionic acid, m.p. 215°–216°C. (uncorr.).

EXAMPLE 84

A. 3-(4-Isopropylbenzoyl)-2-methylindole [II: $R_2$ is $CH_3$; $R_3$ is 4-$(CH_3)_2CHC_6H_4CO$; $R_4$ is H] was prepared by reaction of 45.6 g. (0.25 mole) of 4-isopropylbenzoyl chloride in 100 ml. of absolute ether with the Grignard reagent prepared from 32.9 g. (0.05 mole) of 2-methylindole and 92 ml. (0.28 mole) of a 3M ether solution of ethyl magnesium bromide in a total of about 300 ml. of absolute ether using the procedure described above in Example 1A. The crude product was recrystallized from acetonitrile giving 36.5 g. of 3-(4-isopropylbenzoyl)-2-methylindole.

B. β-[3-(4-Isopropylbenzoyl)-2-methyl-1-indole]propionic acid [I: $R_1$ and $R_4$ are H; $R_2$ is $CH_3$; $R_3$ is 4—$(CH_3)_2CHC_6H_4CO$; Y is $CH_2CH_2$] was prepared by reaction of 36 g. (0.13 mole) of 3-(4-isopropylbenzoyl)-2-methylindole with 24.7 g. (0.14 mole) of ethyl β-bromopropionate in 150 ml. of dimethylformamide in the presence of 5.7 g. (0.14 mole) of a 60 percent suspension of sodium hydride in mineral oil and saponification of the resulting ester, ethyl β-[3-(4-isopropylbenzoyl)-2-methyl-1-indole]propionate, with methanolic alkali using the procedure described above in Example 1B and 1C. The crude product was recrystallized twice from acetonitrile giving 18.1 g. of β-[3-(4-isopropylbenzoyl)-2-methyl-1-indole]propionic acid, m.p. 174.5°–176.5°C. (uncorr.).

EXAMPLE 85

A. 3-(3,4,5-Trimethoxybenzoyl)-2-methylindole [II: $R_2$ is $CH_3$; $R_3$ is 3,4,5—$(CH_3O)_3C_6H_2CO$; $R_4$ is H] was prepared by reaction of 46 g. (0.2 mole) of 3,4,5-trimethoxybenzoyl chloride with the Grignard reagent prepared from 26.2 g. (0.2 mole) of 2-methylindole and 70 ml. (0.21 mole) of a 3M ether solution of ethyl magnesium bromide in 200 ml. of diethyl ether using the procedure described above in Example 1A. The crude product thus obtained was recrystallized from benzene giving 11 g. of 3-(3,4,5trimethoxybenzoyl)-2-methylindole, m.p. 163.5°–166.5°C. (uncorr.).

B. β-[3-(3,4,5-Trimethoxybenzoyl)-2-methyl-1-indole]propionic acid [Ia: $R_1$ is H; $R_2$ is $CH_3$; $R_3$ is 3,4,5—$(CH_3O)_3C_6H_2CO$; Y is $CH_2CH_2$] was prepared by reaction of 5.7 g. (0.03 mole) of ethyl β-bromopropionate with 9.9 g. (0.03 mole) of 3-(3,4,5-trimethoxybenzoyl)-2-methylindole in 100 ml. of dimethylformamide in the presence of 1.32 g. (0.03 mole) of a 60 percent suspension of sodium hydride in mineral oil, and saponification of the resulting ethyl β-[3-(3,4,5-trimethoxybenzoyl)-2-methyl-1-indole]propionate in aqueous methanolic potassium hydroxide all according to the procedure described above in Example 1B and C. The crude product thus obtained was recrystallized from acetonitrile to give 9.6 g. of β-[3-(3,4,5-trimethoxybenzoyl)-2-methyl-1-indole]propionic acid, m.p. 174°–176°C. (uncorr.).

EXAMPLE 86

A. 3-Phenoxy-2-methylindole [II: $R_2$ is $CH_3$; $R_3$ is $C_6H_5O$; $R_4$ is H]

A mixture of 200 g. (2.13 moles) of phenol, 69 g. of potassium carbonate, in 300 ml. of acetone was stirred under reflux in a three-necked flask. A separate solution of 240 ml. (3.0 moles) of chloroacetone and 3 g. of potassium iodide in 260 ml. of acetone was prepared and the latter added dropwise in four portions to the phenol solution, an additional 69 g. of potassium carbonate being added with each portion of the chloroacetone solution. The reaction mixture was stirred on a steam bath overnight, filtered, the filter washed with acetone, and the filtrate taken to dryness. The residue was distilled in vacuo to give 283 g. of phenoxyacetone, b.p. 83°–85°C./1.0 mm; $n_D^{25}$ 1.5185.

A solution of 15 g. (0.1 mole) of phenoxyacetone and 10 ml. (0.1 mole) of phenylhydrazine in 50 ml. of methanol was prepared with external cooling, and the phenoxyacetone phenylhydrazone which separated was collected, washed with cold methanol, and dried to give 23.2 g. of the hyrdrazone, m.p. 72°–75°C.

A solution of the latter (144 g., 0.65 mole) in 500 ml. of glacial acetic acid was heated on a steam bath under a nitrogen atmosphere for 1 hour, and the solution was then cooled and poured into cold water which caused the separation of a gum which gradually solidified on warming to about 40°C. The solid was collected, dissolved in benzene, and chromatographed on silica, the first 2 liters of eluate being discarbed. The next 10 liters of eluate, on evaporation, gave 70 g. of crude 3-phenoxy-2-methylindole which was recrystallized from methanol to give material having m.p. 134°–136°C. (uncorr.).

B. α-(3-Phenoxy-2-methyl-1-indole)acetic acid [I: $R_1$ and $R_4$ are H; $R_2$ is $CH_3$; $R_3$ is $C_6H_5O$; Y is $CH_2$] was prepared by reaction of 15 g. (0.09 mole) of ethyl bromoacetate with 20 g. (0.09 mole) of 3-phenoxy-2-methylindole in 150 ml. of dimethylformamide in the presence of 4.13 g. (0.1 mole) of a 57 percent suspension of sodium hydride in mineral oil, and saponification of the resulting ethyl α-(3-phenoxy-2-methyl-1-indole)acetate with potassium hydroxide in aqueous methanol using the procedure described above in Example 1B and 1C. The crude product thus obtained was recrystallized from aqueous ethanol to give 14.5 g. of α-(3-phenoxy-2-methyl-1-indole)acetic acid, m.p. 187°–189°C.

EXAMPLE 87

β(3-Phenoxy-2-methyl-1-indole)propionic acid [I: $R_1$ and $R_4$ are H; $R_2$ is $CH_3$; $R_3$ is $C_6H_5O$; Y is $CH_2CH_2$] was prepared by reaction of 18.1 g. (0.1 mole) of ethyl β-bromopropionate with 22.3 g. (0.1 mole) of 3-phenoxy-2-methylindole in 150 ml. of dimethylformamide in the presence of 4.26 g. (0.1 mole) of a 57 percent suspension of sodium hydride in mineral oil, and saponification of the resulting ethyl β-(3-phenoxy-2-methyl-1-indole)propionate with potassium hydroxide in aqueous methanol all according to the procedure described above in Example 1B and C. The crude product thus obtained was recrystallized from aqueous ethanol to give 12.9 g. of β-(3-phenoxy-2-methyl-1-indole)propionic acid, m.p. 129°–131°C. (uncorr.).

EXAMPLE 88

A. 3-(2-Chlorobenzoyl)-2-methylindole [II: $R_2$ is $CH_3$; $R_3$ is $2—ClC_6H_4CO$; $R_4$ is H] was prepared by reaction of 80 g. (0.46 mole) of 2-chlorobenzoyl chloride with the Grignard reagent prepared from 60 g. (0.46 mole) of 2-methylindole and 160 ml. (0.48 mole) of a 3M ether solution of ethyl magnesium bromide in 400 ml. of diethyl ether using the procedure described above in Example 1A. The crude product thus obtained was recrystallized from absolute ethanol to give 55 g. of 3-(2-chlorobenzoyl)-2-methylindole as an off-white solid.

B. β-[3-(2-Chlorobenzoyl)-2-methyl-1-indole]propionic acid [Ia: $R_1$ is H; $R_2$ is $CH_3$; $R_3$ is $2—ClC_6H_4CO$; Y is $CH_2CH_2$] was prepared by reaction of 18.1 g. (0.1 mole) of ethyl β-bromopropionate with 27 g. (0.1 mole) of 3-(2-chlorobenzoyl)-2-methylindole in 150 ml. of dimethylformamide in the presence of 4.6 g. (0.11 mole) of a 57 percent suspension of sodium hydride in mineral oil, and saponification of the resulting ethyl β-[3-(2-chlorobenzoyl)-2-methyl-1-indole]-propionate with potassium hydroxide in aqueous methanol all according to the procedure described above in Example 1B and C. The crude product thus obtained was recrystallized from ethanol giving 13.8 g. of β-[3-(2-chlorobenzoyl)-2-methyl-1-indole]propionic acid, m.p. 180°–184°C.

EXAMPLE 89

A. 3-Phenylthio-2-methylindole [II: $R_2$ is $CH_3$; $R_3$ is $C_6H_5S$; $R_4$ is H] was prepared by reacting 308 g. (2.7 moles) of thiophenol with 250 g. (2.7 moles) of chloroacetone in aqueous methanol and reacting 66.4 g. of the phenylmercaptoacetone thus obtained (358 g., recrystallized from methanol, m.p. 35°–36°C.) with 43 g. (0.4 mole) of phenylhydrazine all according to the procedure described above in Example 86A. The crude product thus obtained was recrystallized from aqueous ethanol to give 68.5 g. of 3-phenylthio-2-methylindole, m.p. 130°–131°C.

B. α-(3-Phenylthio-2-methyl-1-indole)acetic acid [I: $R_1$ and $R_4$ are H; $R_2$ is $CH_3$; $R_3$ is $C_6H_5S$; Y is $CH_2$] was prepared by reaction of 14.8 g. (0.22 mole) of ethyl bromoacetate with 33.6 g. (0.14 mole) of 3-phenylthio-2-methylindole in 350 ml. of dimethylformamide in the presence of 6.33 g. (0.15 mole) of a 57 percent suspension of sodium hydride in mineral oil, and saponification of the resulting ethyl α-(3-phenylthio-2-methyl-1-indole)acetate with potassium hydroxide in aqueous methanol all according to the procedure described in Example 1B and C. The crude product thus obtained was recrystallized twice from isopropanol and once from acetone to give 15.7 g. of α-(3-phenylthio-2-methyl-1-indole)acetic acid, m.p. 179°–180°C. (uncorr.).

EXAMPLE 90

β-(3-Phenylthio-2-methyl-1-indole)propionic acid [I: $R_1$ and $R_4$ are H; $R_2$ is $CH_3$; $R_3$ is $C_6H_5S$; Y is $CH_2CH_2$] was prepared by reaction of 25 g. (0.14 mole) of ethyl β-bromopropionate with 33.6 g. (0.14 mole) of 3-phenylthio-2-methylindole in 350 ml. of dry dimethylformamide in the presence of 6.33 g. (0.15 mole) of a 57 percent suspension of sodium hydride in mineral oil, and saponification of the resulting ethyl β-(3-phenylthio-2-methyl-1-indole)propionate with aqueous methanolic potassium hydroxide all according to the procedure described above in Example 1B and C. The crude product was recrystallized from benzene/hexane to give 20.1 g. of β-(3-phenylthio-2-methyl-1-indole)propionic acid, m.p. 121°–122°C. (uncorr.).

EXAMPLE 91

A. 3-(3,4-Methylenedioxybenzoyl)-2-methylindole [II: $R_2$ is $CH_3$; $R_3$ is

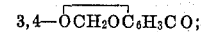

$R_4$ is H] was prepared by reaction of 84 g. (0.46 mole) of 3,4-methylenedioxybenzoyl chloride with the Grignard reagent prepared from 60 g. (0.46 mole) of 2-methylindole and 160 ml. (0.48 mole) of a 3M ether solution of ethyl magnesium bromide in 125 ml. of tetrahydrofuran using the procedure described above in Example 1A. The crude product was recrystallized from acetonitrile to give 41 g. of 3-(3,4-methylenedioxybenzoyl)-2-methylindole, m.p. 200°–202°C.

B. α-[3-(3,4-Methylenedioxybenzoyl)-2-methyl-1-indole]acetic acid [I: $R_1$ and $R_4$ are H; $R_2$ is $CH_3$; $R_3$ is

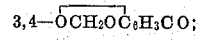

Y is $CH_2$] was prepared by reaction of 14.9 g. (0.09 mole) of ethyl bromoacetate with 25 g. (0.9 mole) of 3-(3,4-methylenedioxybenzoyl)-2-methylindole in 200 ml. of dimethylformamide in the presence of 4.2 g. (0.099 mole) of a 57 percent suspension of sodium hydride in mineral oil, and saponification of the resulting ethyl α-[3-(3,4methylenedioxybenzoyl)-2-methyl-1-indole]acetate with aqueous methanolic potassium hydroxide all according to the procedure described above in Example 1B and C. The crude product thus obtained was recrystallized from acetonitrile to give 13.5 g. of α-[3-(3,4-methylenedioxybenzoyl)-2-methyl-1-indole]acetic acid, m.p. 213°–214.5°C. (uncorr.).

EXAMPLE 92

β-[3-(3,4-Methylenedioxybenzoyl)-2-methyl-1-indole]propionic acid [I: R₁ and R₄ are H; R₂ is CH₃; R₃ is

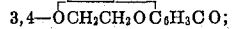

Y is CH₂CH₂] was prepared by reaction of 18.3 g. (0.1 mole) of ethyl β-bromopropionate with 28.2 g. (0.1 mole) of 3-(3,4methylenedioxybenzoyl)-2-methylindole in 200 ml. of dimethylformamide in the presence of 4.65 g. (0.1 mole) of a 57 percent suspension of sodium hydride in mineral oil, and saponification of the resulting ethyl β-[3-(3,4-methylenedioxybenzoyl)-2-methyl-1-indole]propionate with potassium hydroxide in aqueous methanol all according to the procedure described above in Example 1B and C. The crude product thus obtained was recrystallized from ethanol to give 19.0 g. of β-[3-(3,4-methylenedioxybenzoyl)-2-methyl-1-indole]propionic acid, m.p. 180°–182°C. (uncorr.).

EXAMPLE 93

A. 3-(3-Chlorobenzoyl)-2-methylindole [II: R₂ is CH₃; R₃ is 3—ClC₆H₄CO; R₄ is H] was prepared by reaction of 80 g. (0.46 mole) of 3-chlorobenzoyl chloride with the Grignard reagent prepared from 60 g. (0.46 mole) of 2-methylindole and 160 ml. (0.48 mole) of a 3M ether solution of ethyl magnesium bromide in 400 ml. of dry ether using the procedure described above in Example 1A. The crude product thus obtained was recrystallized from dimethylformamide/ethanol giving 88 g. of 3-(3-chlorobenzoyl)-2-methylindole, m.p. 221°–223°C.

B. α-[3-(3-Chlorobenzoyl)-2-methyl-1-indole]acetic acid [Ia: R₁ is H; R₂ is CH₃; R₃ is 3-ClC₆H₄CO; Y is CH₂] was prepared by reaction of 21.7 g. (0.13 mole) of ethyl bromoacetate with 35 g. (0.13 mole) of 3-(3-chlorobenzoyl)-2-methylindole in 400 ml. of dry dimethylformamide in the presence of 6 g. (0.14 mole) of a 57 percent suspension of sodium hydride in mineral oil, and saponification of the resulting ethyl α-[3-(3-chlorobenzoyl)-2-methyl-1-indole]acetate with aqueous methanolic potassium hydroxide all according to the procedure described in Example 1B and C. The crude product was recrystallized from ethanol giving 21.5 g. of α-[3-(3-chlorobenzoyl)-2-methyl-1-indole]acetic acid, m.p. 197°–200°C. (uncorr.).

EXAMPLE 94

β-[3-(3-Chlorobenzoyl)-2-methyl-1-indole]propionic acid [Ia: R₁ is H; R₂ is CH₃; R₃ is 3—ClC₆H₄CO; Y is CH₂CH₂] was prepared by reaction of 23.5 g. (0.13 mole) of ethyl β-bromopropionate with 35 g. (0.13 mole) of 3-(3-chlorobenzoyl)-2-methylindole in 400 ml. of dry dimethylformamide in the presence of 6 g. (0.14 mole) of a 57 percent suspension of sodium hydride in mineral oil, and saponification of the resulting ethyl β-[3-(3-chlorobenzoyl)-2-methyl-1-indole]propionate with aqueous methanolic potassium hydroxide all according to the procedure described above in Example 1B and C. The crude product thus obtained was recrystallized twice from absolute ethanol to give 20.5 g. of β-[3-(3-chlorobenzoyl)-2-methyl-1-indole]propionic acid, m.p. 175°–178°C.

EXAMPLE 95

A. 3-Benzoyl-2-methyl-5-chloroindole [II: R₂ is CH₃; R₃ is C₆H₅CO; R₄ is 5—Cl] was prepared by reaction of 28.2 g. (0.2 mole) of benzoyl chloride with the Grignard reagent prepared from 33 g. (0.2 mole) of 2-methyl-5-chloroindole and 70 ml. (0.2 mole) of a 3M ether solution of ethyl magnesium bromide in 200 ml. of diethyl ether using the procedure described above in Example 1A. The crude product was recrystallized from ethanol giving 17 g. of 3-benzoyl-2-methyl-5-chloroindole, m.p. 242°–244°C. (uncorr.).

B. α-(3-Benzoyl-2-methyl-5-chloro-1-indole)acetic acid [Ib: R₁ is H; R₂ is CH₃; R₃ is C₆H₅CO; Hal is 5—Cl; Y is CH₂] was prepared by reaction of 10.5 g. (0.06 mole) of ethyl bromoacetate with 17 g. (0.6 mole) of 3-benzoyl-2-methyl-5-chloroindole in 150 ml. of dimethylformamide in the presence of 2.94 g. (0.07 mole) of a 57 percent suspension of sodium hydride in mineral oil, and saponification of the resulting ethyl α-(3-benzoyl-2-methyl-5-chloro-1-indole)acetate with aqueous methanolic potassium hydroxide all according to the procedure described above in Example 1B and C. The crude product thus obtained was recrystallized from ethyl acetate to give 8.45 g. of α-(3-benzoyl-2-methyl-5-chloro-1-indole)acetic acid, m.p. 237°–240°C. (uncorr.).

EXAMPLE 96

β-(3-Benzoyl-2-methyl-5-chloro-1-indole)propionic acid [Ib: R₁ is H; R₂ is CH₃; R₃ is C₆H₅CO; Hal is 5—Cl; Y is CH₂CH₂] was prepared by reaction of 10.8 g. (0.59 mole) of ethyl bromoacetate with 16 g. (0.59 mole) of 3-benzoyl-2-methyl-5-chloroindole in 150 ml. of dry dimethylformamide in the presence of 2.95 g. (0.07 mole) of a 57 percent suspension of sodium hydride in mineral oil, and saponification of the resulting ethyl β-(3-benzoyl-2-methyl-5-chloro-1-indole)propionate with aqueous methanolic potassium hydroxide all according to the procedure described above in Example 1B and C. The crude product (12.5 g.) was recrystallized from acetonitrile/dimethylformamide to give 10.6 g. of β-(3-benzoyl-2-methyl-5-chloro-1-indole)propionic acid, m.p. 246°–248°C. (uncorr.).

EXAMPLE 97

A. 3-(2-Methylbenzoyl)-2-methylindole [II: R₂ is CH₃; R₃ is 2—CH₃C₆H₄CO; R₄ is H] was prepared by reaction of 71 g. (0.46 mole) of 2-methylbenzoyl chloride with the Grignard reagent prepared from 60 g. (0.46 mole) of 2-methylindole and 160 ml. (0.48 mole) of a 3M ether solution of ethyl magnesium bromide in 400 ml. of dry ether. The product thus obtained was recrystallized from absolute ethanol to give 76 g. of 3-(2-methylbenzoyl)-2-methylindole.

B. α-[3-(2-Methylbenzoyl)-2-methyl-1-indole]acetic acid [I: R₁ and R₄ are H; R₂ is CH₃; R₃ is 2—CH₃C₆H₄CO; Y is CH₂] was prepared by reaction of 23.4 g. (0.14 mole) of ethyl bromoacetate with 35 g. (0.14 mole) of 3-(2-methylbenzoyl)-2-methylindole in 200 ml. of dry dimethylformamide in the presence of 6.45 g. (0.15 mole) of a 57 percent suspension of sodium hydride in mineral oil, and saponification of the resulting ethyl α-[3-(2-methylbenzoyl)-2-methyl-1-indole]acetate with aqueous methanolic potassium hydroxide all according to the procedure described above in Example 1B and C. The crude product thus obtained was recrystallized once from acetonitrile and once from ethyl acetate to give 10.2 g. of α-[3-(2-methylbenzoyl)-2-methyl-1-indole]acetic acid, m.p. 210°–212°C. (uncorr.).

EXAMPLE 98

β-[3-(2-Methylbenzoyl)-2-methyl-1-indole]propionic acid [I: $R_1$ and $R_4$ are H; $R_2$ is $CH_3$; $R_3$ is 2—$CH_3C_6H_4CO$; Y is $CH_2CH_2$] was prepared by reaction of 25.4 g. (0.14 mole) of ethyl β-bromopropionate with 35 g. (0.14 mole) of 3-(2-methylbenzoyl)-2-methylindole in 200 ml. of dry dimethylformamide in the presence of 6.45 g. (0.15 mole) of a 57 percent suspension of sodium hydride in mineral oil, and saponification of the resulting ethyl β-[3-(2-methylbenzoyl)-2-methyl-1-indole]propionate with aqueous methanolic potassium hydroxide all according to the procedure described above in Example 1B and C. The crude product thus obtained was recrystallized from ethanol to give 16.2 g. of β-[3-(2-methylbenzoyl)-2-methyl-1-indole]propionic acid, m.p. 150°–152°C. (uncorr.).

EXAMPLE 99

A. 3-Phenylsulfonylmethyl-2-methylindole [II: $R_2$ is $CH_3$; $R_3$ is $C_6H_5SO_2CH_2$; $R_4$ is H].

A mixture of 52.5 g. (0.14 mole) of 2-methylindole, 14.6 g. (0.46 mole) of paraformaldehyde, 80.1 g. (0.16 mole) of phenylsulfinic acid, 36 ml. of acetic acid, and 340 ml. of dimethylformamide was heated slowly to 150°C., and maintained at that temperature for three hours. The mixture was then diluted with one liter of water, and the solid which separated was collected by filtration, washed with water, and recrystallized from methanol to give three crops of product totaling 85 g. of 3-phenylsulfonylmethyl-2-methylindole, m.p. 179°–180°C.

B. α-(3-Phenylsulfonylmethyl-2-methyl-1-indole)acetic acid [I: $R_1$ and $R_4$ are H; $R_2$ is $CH_3$; $R_3$ is $C_6H_5SO_2CH_2$; Y is $CH_2$] is prepared by reaction of 3-phenylsulfonylmethyl-2-methylindole with ethyl bromoacetate in dimethylformamide in the presence of sodium hydride, and saponification with aqueous methanolic potassium hydroxide of the resulting ethyl α-(3-phenylsulfonylmethyl-2-methyl-1-indole)-acetate.

EXAMPLE 100

A. 3-Cyclopropylcarbonyl-2-methyl-7-nitroindole [II: $R_2$ is $CH_3$; $R_3$ is $C_3H_5CO$; $R_4$ is 7—$NO_2$] is prepared by reaction of cyclopropylcarboxylic acid chloride with the Grignard reagent prepared from ethyl magnesium bromide and 2-methyl-7-nitroindole (Towne et al., U.S. Pat. No. 2,607,779) using the procedure above in Example 1A.

B. α-(3-Cyclopropylcarbonyl-2-methyl-7-nitro-1-indole)acetic acid [I: $R_1$ is H; $R_2$ is $CH_3$; $R_3$ is $C_3H_5CO$; $R_4$ is 7—$NO_2$; Y is $CH_2$] is prepared by reaction of ethyl bromoacetate with 3-cyclopropylcarbonyl-2-methyl-7-nitroindole in dry dimethylformamide in the presence of sodium hydride, and saponification of the resulting ethyl (3-cyclopropylcarbonyl-2-methyl-7-nitro-1-indole)acetate all according to the procedure described above in Example 1B and C.

EXAMPLE 101

α-(3-Cyclopropylcarbonyl-2-methyl-7-amino-1-indole)acetic acid [I: $R_1$ is H; $R_2$ is $CH_3$; $R_3$ is $C_3H_5CO$; $R_4$ is 7—$NH_2$; Y is $CH_2$] is prepared by catalytic reduction of α-(3-cyclopropylcarbonyl-2-methyl-7-nitro-1-indole)acetic acid with hydrogen over a palladium-on-charcoal catalyst in an ethanol solvent.

EXAMPLE 102

α-(3-Cyclopropylcarbonyl-2-methyl-7-dimethylamino-1-indole)acetic acid [I: $R_1$ is H; $R_2$ is $CH_3$; $R_3$ is $C_3H_5CO$; $R_4$ is 7—$(CH_3)_2N$; Y is $CH_2$] is prepared by catalytic reduction of a mixture of α-(3-cyclopropylcarbonyl-2-methyl-7-amino-1-indole)acetic acid and formaldehyde over a palladium-on-charcoal catalyst using the procedure described above in Example 40.

EXAMPLE 103

α-(3-Cyclopropylcarbonyl-2-methyl-7-acetylamino-1-indole)acetic acid [I: $R_1$ is H; $R_2$ is $CH_3$; $R_3$ is $C_3H_5CO$; $R_4$ is 7—$CH_3CONH$; Y is $CH_2$] is prepared by reaction of α-(3-cyclopropylcarbonyl-2-methyl-7-amino-1-indole)acetic acid with acetic anhydride in a glacial acetic acid solvent.

EXAMPLE 104

A. 3-(3,4-Ethylenedioxybenzoyl)-2-methylindole [II: $R_2$ is $CH_3$; $R_3$ is

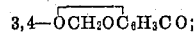

$R_4$ is H] is prepared by reaction of 3,4-ethylenedioxybenzoyl chloride with the Grignard reagent prepared from ethyl magnesium bromide and 2-methylindole using the procedure described above in Example 1A.

B. α-[3-(3,4-Ethylenedioxybenzoyl)-2-methyl-1-indole]acetic acid [I: $R_1$ and $R_4$ are H; $R_2$ is $CH_3$; $R_3$ is

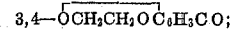

Y is $CH_2$] is prepared by reaction of ethyl bromoacetate with 3-(3,4-ethylenedioxybenzoyl)-2-methylindole in dry dimethylformamide in the presence of sodium hydride, and saponification of the resulting ethyl α-[3-(3,4-ethylenedioxybenzoyl)-2-methyl-1-indole]acetate all according to the procedure described above in Example 1B and C.

EXAMPLE 105

α-[3-(4-Chlorobenzyl)-1-indole]acetic acid [I: $R_1$, $R_2$, and $R_4$ are H; $R_3$ is 4—$ClC_6H_4CH_2$; Y is $CH_2$]

A mixture of 112 g. (0.35 mole) of ethyl α-[3-(4-chlorobenzoyl)-1-indole]acetate, 68 g. of potassium hydroxide pellets, 57 ml. of 85 percent hydrazine hydrate and 570 ml. of triethylene glycol was heated with stirring under a nitrogen atmosphere at about 136°C. for 3 hours and then refluxed for 6 hours. The mixture was then cooled, diluted with 700 ml. of water and neutralized by the slow addition of dilute hydrochloric acid. The solid which separated was collected and dried to give 114 g. of α-[3-(4-chlorobenzyl)-1-indole]acetic acid, m.p. 160°–165°C. (uncorr.). A small sample, recrystallized from benzene afforded material of m.p. 161.5°–164°C.

EXAMPLE 106

α-(3-Benzyl-1-indole)acetic acid [I: $R_1$, $R_2$, and $R_4$ are H; $R_3$ is $C_6H_5CH_2$; Y is $CH_2$] was prepared by reduction of 122 g. (0.4 mole) of ethyl α-(3-benzoyl-1-

UNITED STATES PATENT AND TRADEMARK OFFICE
CERTIFICATE OF CORRECTION

PATENT NO. : 3,843,683
DATED : October 22, 1974
INVENTOR(S) : Malcolm R. Bell

It is certified that error appears in the above-identified patent and that said Letters Patent are hereby corrected as shown below:

Column 7, line 23, "doseresponse" should read - -dose-response- -.

Column 7, line 28, "<1,000" should read - ->1,000- -.

Column 7, line 50, "at" should read - -a- -.

Signed and Sealed this

Nineteenth Day of January 1982

[SEAL]

Attest:

GERALD J. MOSSINGHOFF

Attesting Officer     Commissioner of Patents and Trademarks